(12) United States Patent
Ying et al.

(10) Patent No.: US 11,689,367 B2
(45) Date of Patent: Jun. 27, 2023

(54) AUTHENTICATION METHOD AND SYSTEM

(71) Applicants: Bidi Ying, Ottawa (CA); Hang Zhang, Nepean (CA)

(72) Inventors: Bidi Ying, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 17/031,205

(22) Filed: Sep. 24, 2020

(65) Prior Publication Data
US 2022/0094546 A1 Mar. 24, 2022

(51) Int. Cl.
| | |
|---|---|
| *H04M 1/66* | (2006.01) |
| *H04M 1/68* | (2006.01) |
| *H04M 3/16* | (2006.01) |
| *H04L 9/32* | (2006.01) |
| *H04W 12/06* | (2021.01) |

(Continued)

(52) U.S. Cl.
CPC ............ *H04L 9/321* (2013.01); *H04L 9/14* (2013.01); *H04L 9/30* (2013.01); *H04L 9/3247* (2013.01); *H04L 63/0892* (2013.01); *H04W 12/06* (2013.01)

(58) Field of Classification Search
CPC ... H04L 9/321; H04L 9/14; H04L 9/30; H04L 9/3247; H04L 63/0892; H04L 2209/80; H04L 9/3273; H04L 9/50; H04W 12/08; H04W 12/75; H04W 12/06; H04W 12/03; H04W 12/069; H04W 12/106; H04W 12/122; H04B 7/0452; H04B 1/0003; H04B 7/0617; H04B 7/0626; H04M 15/66; H04M 15/61; H04M 15/8016; H04M 15/8038;

(Continued)

(56) References Cited

U.S. PATENT DOCUMENTS 10,361,843 B1 * 7/2019 Suthar .................. G06Q 20/065
10,448,251 B1 * 10/2019 Maria ................... H04W 12/06

(Continued)

FOREIGN PATENT DOCUMENTS

TW 201947910 A 12/2019

*Primary Examiner* — Stephen M D Agosta

(57) ABSTRACT

There is provided an authentication method and system where protection of user equipment (UE) privacy and network security can be improved. The system includes a third party communicatively trusted by and connected to the UE and one or more network entities, the third party configured to obtain identity information indicative of identity of the UE or the network entities and verify the UE and the network entities on whether the UE and the network entities are authorized to perform communications in the communication network. The third party is further configured to create mapping information, the mapping information including mappings between each identity indicated by the identity information and a respective temporary authentication identifier (ID) and according to the mapping information, transmit the respective temporary authentication ID to each of the UE and the network entities that are verified successfully by the third party. The system further includes the one or more network entities to which the UE is authenticated to access, each of the network entities configured to communicate with the UE or other network entities based on their respective temporary authentication ID.

17 Claims, 19 Drawing Sheets

(51) Int. Cl.
*H04L 9/40* (2022.01)
*H04L 9/14* (2006.01)
*H04L 9/30* (2006.01)

(58) Field of Classification Search
CPC .. H04M 15/81; H04J 11/0079; H04J 11/0056; H04J 11/0059; H04J 14/02
See application file for complete search history.

(56) References Cited

U.S. PATENT DOCUMENTS

| | | | |
|---|---|---|---|
| 2016/0150574 A1* | 5/2016 | Edge | H04W 4/02 455/404.2 |
| 2016/0183081 A1* | 6/2016 | Flores Cuadrado | H04M 15/50 455/558 |
| 2017/0164212 A1* | 6/2017 | Opsenica | G06F 16/41 |
| 2018/0310238 A1* | 10/2018 | Opsenica | H04W 12/06 |
| 2019/0220756 A1* | 7/2019 | Williams | G06F 16/353 |
| 2019/0294666 A1 | 9/2019 | Williams et al. | |
| 2019/0347653 A1* | 11/2019 | Lu | G06Q 20/3825 |
| 2019/0347654 A1* | 11/2019 | Lu | G06Q 20/405 |
| 2019/0349199 A1* | 11/2019 | Wang | H04L 9/3228 |
| 2019/0349200 A1 | 11/2019 | Wang et al. | |
| 2019/0379664 A1* | 12/2019 | Suthar | H04W 4/70 |
| 2020/0057860 A1* | 2/2020 | Patil | G06F 21/6209 |
| 2020/0112492 A1* | 4/2020 | Chatras | H04W 48/18 |
| 2020/0137576 A1* | 4/2020 | Hu | H04W 48/18 |
| 2020/0280854 A1* | 9/2020 | Kunz | H04L 9/083 |
| 2020/0304995 A1* | 9/2020 | White | H04W 12/06 |
| 2020/0351650 A1* | 11/2020 | Maria | G06F 9/45558 |
| 2022/0007182 A1* | 1/2022 | Stojanovski | H04W 12/041 |
| 2022/0303762 A1* | 9/2022 | Ben Henda | H04W 12/03 |

\* cited by examiner

AUTHENTICATION METHOD AND SYSTEM

FIELD OF THE INVENTION

The present disclosure pertains to authentication in communication networks and in particular to an authentication method and system, especially in unified authentication architecture.

BACKGROUND

In current networking systems (e.g. current 5G networking systems), sensitive information such as user credentials is often transmitted or exposed, for example for registration, from user equipment (UE) to a home operator which also stores the sensitive information received. At least some sensitive information may be kept at the home operator or network functions for separate access network authentication from home operator, slice, or third-party. As such, there are risks that undesired parties may obtain the sensitive information and this possibility further pertains to UE privacy issues. For instance, given that unique UE identifiers (e.g. subscription permanent identifier (SUPI) or subscription concealed identifier (SUCI)) can be provided to network functions like the access management function (AMF), session management function (SMF), and authentication server function (AUSF), serious security and privacy issues can be raised especially when these network functions are attacked, or when the unique UE identifiers are tracked by eavesdropping attackers.

In current networking systems, many third-party servers can keep user credentials. For example, a current technique (e.g. oauth 2.0, single sign-on (SSO)) enables an application server to login into the resource server using a temporary token. Such techniques many enable many servers to easily access to sensitive and private information (e.g. user account information, driver's licence number, cellphone number) even when not all elements in the system have been trusted. Due to un-trust ecosystems (e.g. services, third party applications), users are unwilling to provide service providers with their sensitive and private information when registering to services.

Current networking system have further problems. In current networking systems, multiple authentications are employed due to untrusted relationships between network participators or entities. Some examples of the multiple authentications include primary registration (or network access) authentication by a home operator, slice access authentication, service access authentication and authentications among application server and home operator. However, while these multiple authentications are implemented to mitigate a potential impact resulting from malicious activities of threat actors like fake infrastructure, fake application servers, fake base stations and fake slice providers, the separate authentications can also bring heavy communication overhead and a long delay in the networking system.

In the current third Generation Partnership Project (3GPP) networking systems, a UE may be authenticated by the home operator when the UE moves out of the registration area of the home operator. As such, a UE needs to be authenticated by a home operator frequently, due to its mobility. This frequent roaming authentication can lead to extra communication overhead and long latency, potentially resulting poor network performance and network session or call drops. These problems may be aggravated in high-mobility scenarios, for example when a UE is located in a vehicle moving on a highway or in a high speed train.

Therefore there is a need for a solution for authenticating devices for communication services that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide an authentication method and system to improve protection of UE privacy and network security. The unified authentication architecture would provide one-time mutual authentication for multiple participators, and enable temporary ID or authentication ID. The temporary ID or authentication ID is used for UE access authentication and session communications.

In accordance with embodiments of the present disclosure, there is provided system for unified authentication of a user equipment (UE) in a communication network. The system includes a third party communicatively trusted by and connected to the UE and one or more network entities, the third party configured to obtain identity information indicative of identity of the UE or the network entities and verify the UE and the network entities on whether the UE and the network entities are authorized to perform communications in the communication network. The third party is further configured to create mapping information, the mapping information including mappings between each identity indicated by the identity information and a respective temporary authentication identifier (ID) and according to the mapping information, transmit the respective temporary authentication ID to each of the UE and the network entities that are verified successfully by the third party. The system further includes the one or more network entities to which the UE is authenticated to access, each of the network entities configured to communicate with the UE or other network entities based on their respective temporary authentication ID.

A possible technical advantage of this feature can be that due to possible untrusted relationships between communication network entities for example cells, infrastructure providers, application servers and slice providers, the system according to embodiments can provide unified authentication can enable network entities to perform mutual authentication during initial access to network/service, thereby reducing heavy communication overhead in the network systems. In various embodiments, temporary IDs may be used for communication with various network entities thereby enabling sensitive information to be maintained at a trusted third party. The use of a temporary ID and mutual authentication can enable effective UE ID management, alleviate issues related to UE ID privacy and network security.

In accordance with embodiments, there is provided a method for unified authentication of a user equipment (UE) in a communication network. The method includes obtaining, by a third party communicatively trusted by and connected to the UE and one or more network entities, identity information indicative of identity of the UE or the network entities and verifying, by the third party, the UE and the network entities on whether the UE and the network entities are authorized to perform communications in the communication network. The method further includes creating, by the third party, mapping information, the mapping information including mappings between each identity indicated by the identity information and a respective temporary authentication identifier (ID) and according to the mapping information, transmitting, by the third party, the respective temporary authentication ID to each of the UE and the network entities that are verified successfully by the third party. The method further includes communicating, by the one or more network entities to which the UE is authenticated to access, with the UE or other network entities based on their respective temporary authentication ID.

In some embodiments, the each of the network entities are further configured to manage mobility of the UE. The network entities can be configured to receive a request for updating the temporary authentication ID, the request including the temporary authentication ID and an ID of an entity that sends the request and verifying the temporary authentication ID. Upon a successful verification, the network entities can be configured to generate one or more new temporary authentication ID and updating local mapping information to include mappings associated with the new temporary authentication IDs and notify the third party and other network entities of the new temporary authentication ID.

A possible technical advantage of this feature can be that a unified authentication system according to embodiments can mitigate extra message exchanges for a high mobility UE.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present disclosure may provide

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
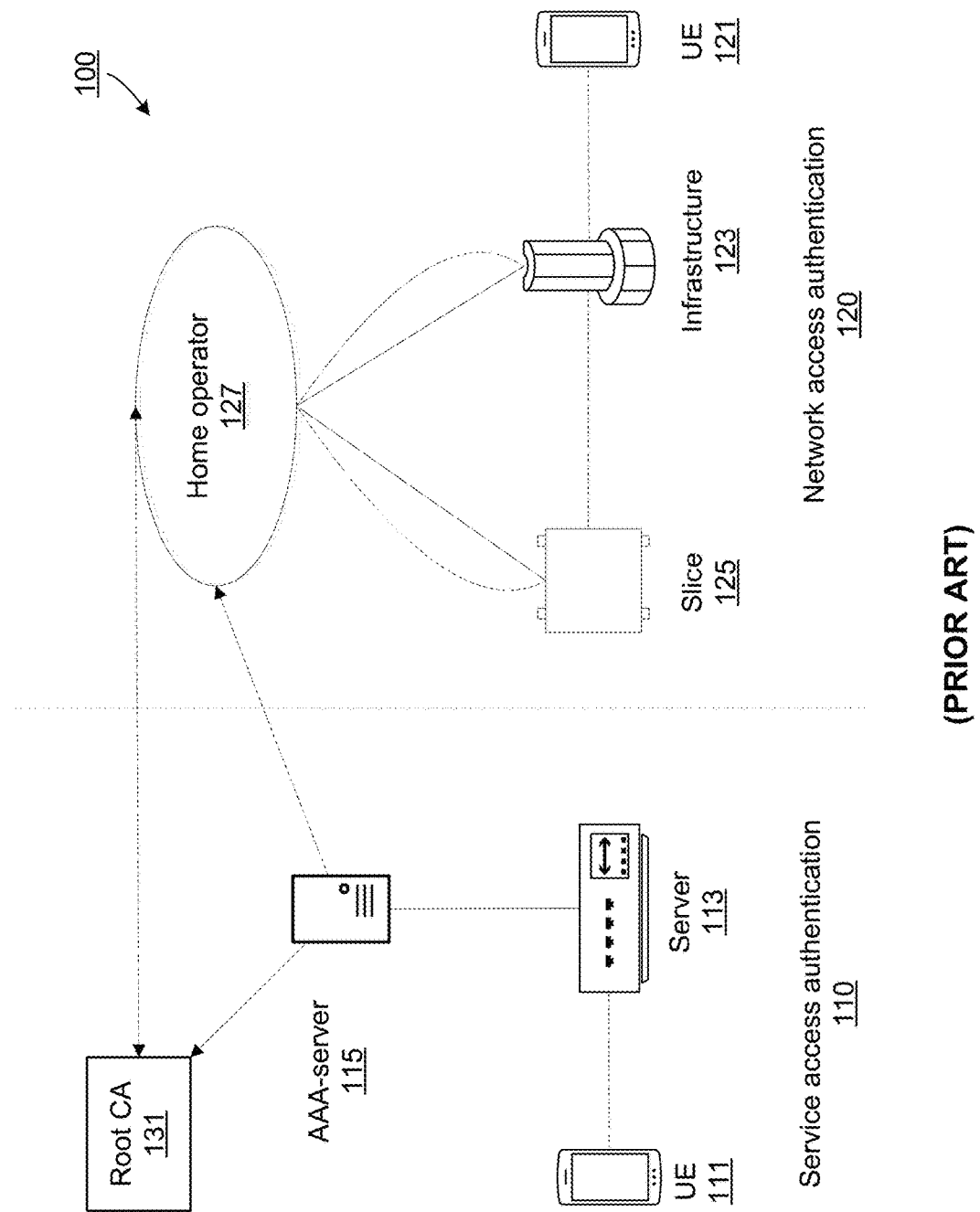
FIG. 1 illustrates architecture for access authentication in the current Third Generation Partnership Project (3GPP) system.

In the present disclosure, an identifier (ID) refers to information or a set of information used for uniquely identifying an entity (e.g. network entity, UE, etc.).

The present disclosure provides a unified authentication architecture based on a distributed trust third party (e.g. configured using a blockchain configuration using a blockchain, or public key infrastructure (PKI)) for communication services. The unified authentication architecture can provide privacy protection (e.g. ID privacy protection) and provide (one-time) mutual authentications for a participator (e.g. user equipment (UE), application server, infrastructure provider, slice provider, cell or base station) and manage respective authentication materials (e.g. UE's public key as one of the UE's authentication materials, UE temporary ID or authentication ID). According to embodiments, some of the materials provided by the participator (e.g. public key) are stored in their chains (e.g. UE public key chain (UE-PKC), slice public key chain (slice-PKC), service public key chain (server-PKC), infrastructure public key chain (Inf-PKC), InfM public key chain (InfM-PKC)). The materials stored in the participator's chains can be hardware-tampering protected and refreshed authentication materials may be delivered through a secure communication channel. A method of creating and managing the participator's chain(s) is provided. It is understood that a serving public key is a public key that is being used or a public key that is available for use.

According to embodiments, in the unified authentication architecture, each role, participator or entity (e.g. service provider, slice provider, infrastructure provider) is decoupled and may act as an operator, a vender, or a third-party service provider. Each role or UE may register with the distributed trust third party (e.g. configured using a blockchain configuration), obtain respective public/private key or subscription, respectively and performs mutual authentication upon support of the distributed trust third party.

According to embodiments, the unified authentication architecture can reduce the risk of UE privacy disclosure when compared to current systems where vulnerability exists because authentication material is stored at home operators or servers. According to embodiments, the unified authentication architecture can decouple UE authentication from network operation or services and can provide roaming-free and less communication overhead and delay. In this unified authentication architecture, private and sensitive information of the UE may be kept in distributed third party. In this way, the private and sensitive information of the UE can be unknown to network. Network has no knowledge with regards to real UE ID or mapping information (e.g. mapping table) between the real UE ID and authentication ID or temporary ID. As such, real UE ID privacy (or UE's real identity) can be protected. According to embodiments, in the unified authentication architecture, fake network entities such as fake cells, fake infrastructure, fake base stations, fake slice providers and fake servers can be avoided. As such, the impacts resulting from an untrusted relationship between participators, especially infrastructure and application servers, can be effectively mitigated.

The present disclosure further provides a method of a method and a network function (or apparatus) for managing mobility of a user equipment (UE) in a communication network. The method may include managing UE identifiers (e.g. mapping UE ID, refreshing temporary UE ID or authentication UE ID) during access authentication in the unified authentication architecture. The access authentication may include service access authentication and network access authentication. The method for managing mobility of a UE may include generating a new temporary ID or authentication ID associated with the UE and network entities, and notifying the network entities of the generated temporary ID or authentication ID in order to update the communication relationship between them. According to embodiments, the unified authentication architecture may enable temporary UE ID or authentication UE ID. According to embodiments, the original real UE identifiers (IDs) are stored in a distributed trust third party (e.g. configured as a blockchain) and temporary UE IDs or authentication UE IDs are stored in different entities or roles. It is the temporary UE IDs or authentication UE IDs that are used for session communications and access authentications. As stated above, the temporary UE IDs or authentication UE IDs may be updated or refreshed during access authentication in the unified authentication architecture. In this way, tracking attacks can be resisted or prevented.

The decoupled UE IDs (e.g. original real UE ID being decoupled from the temporary UE ID or authentication UE ID) may alleviate issues related to UE ID privacy and network security. For example, the decoupled UE IDs mitigate risks against denial of service (DoS) attacks launched by fake UEs or malicious activities of fake cell towers (e.g. resulting from a modified cell tower with a malicious operator).

According to embodiments, a UE can be configured as a machine-to-machine (M2M) device. For example the UE can be configured as an internet of things (IoT) device, wearable devices, vehicular devices, vehicular mounted devices, vehicle on-board equipment or other configuration of a UE as would be readily understood by a worker skilled in the art.

According to some embodiments, the unified authentication architecture based on a distributed trust third party for communication services can be applicable to satellite communications and internet of vehicle (IoV) applications.

FIG. 1 illustrates an architecture 100 for access authentication in the current Third Generation Partnership Project (3GPP) system such as 5G networking system. Referring to FIG. 1, the current access authentication architecture 100 includes the service access authentication system 110 and the network access authentication system 120. The service access authentication system 110 comprises the UE 111, the server 113 and the authentication authorization and accounting (AAA) server 115. The UE 111 and the server 113 are communicatively connected to each other, and the server 113 and the AAA-server 115 are communicatively connected to each other. The AAA-server 115 is communicatively connected to the central root certificate authority (CA) 131, a trusted authority that publishes a root certificate. The UE 111 may register to the service authentication server 115 for access to an application server (e.g. server 113).

The network access authentication system 120 includes the UE 121, the infrastructure provider 123, the slice provider 125 and the home operator 127. The UE 121 is communicatively connected to the infrastructure provider 123 which is communicatively connected to the slice provider 125. Each of the infrastructure provider 123 and the slice provider 125 is communicatively connected to the home operator 127. The home operator 127 is communicatively connected to the central root CA 131.

In the network access authentication system 120, the UE 121 typically registers with the home operator 127 and is authenticated by the home operator 127. The registration and authentication process may be performed through the infrastructure provider 123, the slice provider 125 or both. In this system, the UE ID (e.g. SUPI) is maintained in network functions for communications. In some cases when slice specific authentication is required, the authentication may proceed through operation of a home public land mobile network (hPLMN). For example, slice specific authentication may require authentication by a home authentication server function (hAUSF).

For both service access authentication system 110 and network access authentication system 120, the central root CA 131 may be used to generate and issue certificates. It has been realized that this central architecture has disadvantages. For example, a large burden can be placed on the central root CA 131 due to heavy certificate revocation, and the central root CA 131 often becomes a threat actor's target. Moreover, this central architecture has vulnerabilities with respect to user privacy disclosure as the sensitive authentication materials of the UEs (e.g. UE 111 and UE 121) are typically maintained in home operator, network functions or servers (e.g. application servers) for (service) access authentication. Further, multiple authentications, such as network access authentication, slice authentication, service access authentication, can result in long delays and heavy overhead in a communication network. The central architecture may also break a network session or service continuity due to a UE's mobility, particularly in high-mobility scenarios.

Figure 2:
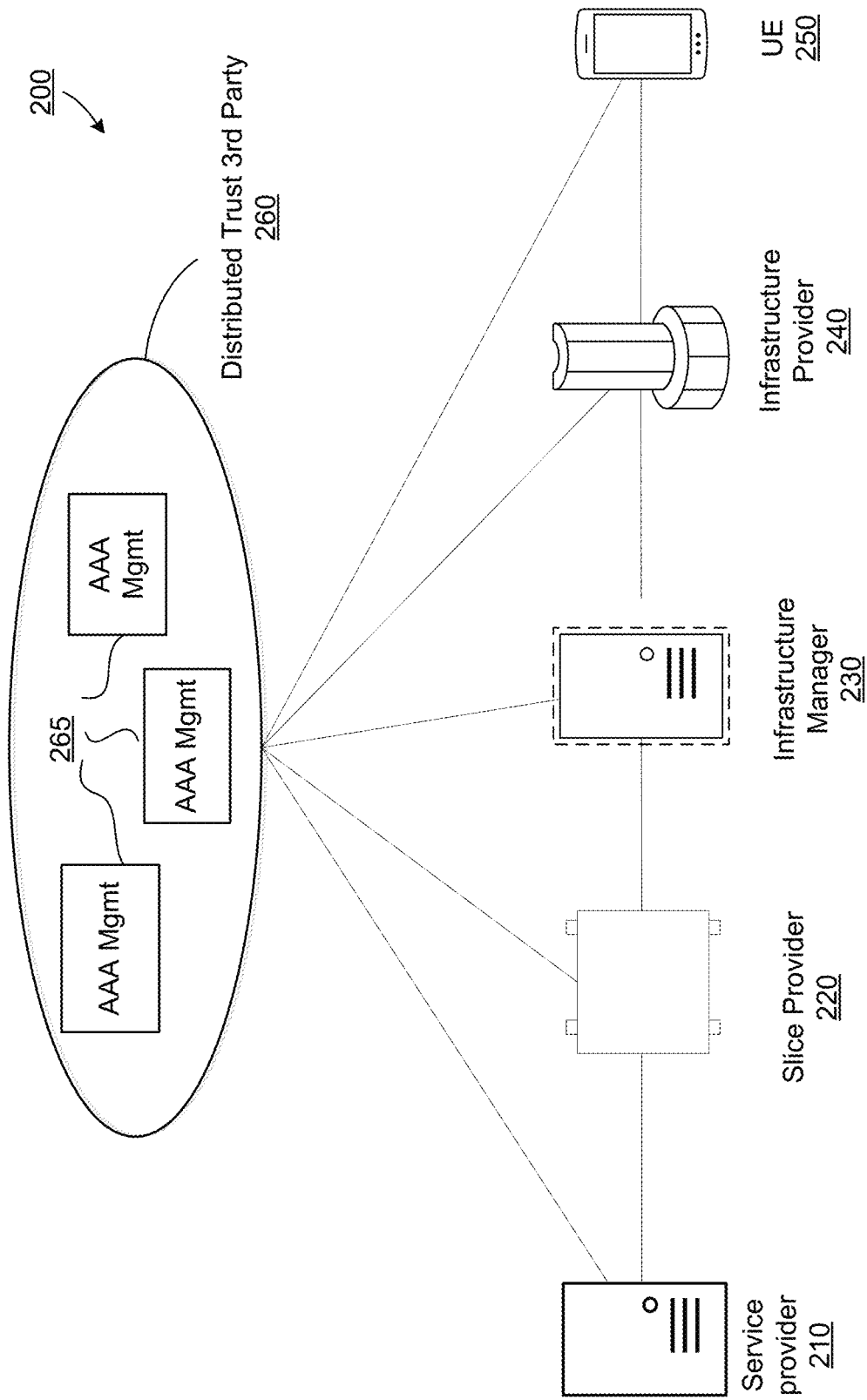
FIG. 2 illustrates the architecture of access authentication based on a distributed trust third party, in accordance with embodiments.

In order to diminish these disadvantages of the central authentication architectures, the present disclosure provides a unified authentication architecture as illustrated in FIG. 2. FIG. 2 illustrates the unified authentication architecture 200 for access authentication based on a distributed trust third party, in accordance with embodiments of the present disclosure. The architecture 200 facilitates ID management, mutual authentication, and UE subscription provisioning. In the architecture 200, unlike current systems, UE's authentication materials such as the UE's public key and temporary ID or authentication ID are stored at the distributed trust third party (e.g. configured as a blockchain PKI). This configuration allows the architecture 200 to provide several benefits such as privacy protection, roaming-free and reduced network communication overhead and delay. In addition, this unified authentication architecture 200 is extendable and open, and each member (entity) in the architecture 200 is substantially equal in authority and/or trust level and is connected to one another for example peer-to-peer. Further, the architecture 200 can effectively deter fake network entities such as fake cells, fake infrastructure, fake base stations, fake slice providers and fake servers.

Referring to FIG. 2, the unified authentication architecture 200 includes one or more of the service provider 210, slice provider 220, infrastructure manager 230, infrastructure provider 240, UE 250 and the distributed trust third party 260. Each of the service provider 210, slice provider 220, infrastructure manager 230, infrastructure provider 240 and UE 250 are communicatively connected to the distributed trust third party 260. An example of the distributed trust third party 260 is configured as a blockchain public key infrastructure (PKI) but it may be a trust party using other suitable authenticating technology. In some embodiments, the unified authentication architecture 200 can further include other network entities (e.g. network entities that are not illustrated in FIG. 2) and these other network entities, if they are part of the unified authentication architecture 200, are communicatively connected to the distributed trust third party 260.

According to embodiments, each of the service provider 210, slice provider 220, infrastructure manager 230 and infrastructure provider 240 may be decoupled and act, for example, as an operator, a vender, or a third-party service provider. Each of the service provider 210, slice provider 220, infrastructure manager 230, infrastructure provider 240 and UE 250 may register itself to the distributed trust third party 260 (e.g. configured as a blockchain PKI) and obtains respective public/private key or subscription. Each of the service provider 210, slice provider 220, infrastructure manager 230, infrastructure provider 240 and UE 250 may mutually authenticate each other with support of the distributed trust third party 260. The original real UE ID is stored in the distributed trust third party 260 and various temporary UE IDs or authentication UE IDs are stored in the service provider 210, slice provider 220, infrastructure manager 230 and infrastructure provider 240, respectively. These temporary UE IDs or authentication UE IDs are used for session communications between each entity (e.g. role, participator) and UE access authentication.

The service provider 210 may be a service provider and communicatively connected to the slice provider 220. The service provider 210 and the slice provider 220 mutually authenticate each other upon support of the distributed trust third party 260. The service provider 210 and the slice provider 220 may use a temporary identifier or authentication identifier such as UE_server_TID for session communications there between. The temporary identifier or authentication identifier used for session communications between the service provider 210 and the slice provider 220 may be stored in the service provider 210.

The slice provider 220 may be a slice provider and communicatively connected to the infrastructure manager 230. The slice provider 220 and the infrastructure manager 230 mutually authenticate each other with support of the distributed trust third party 260. The slice provider 220 and the infrastructure manager 230 may use a temporary identifier or authentication identifier such as UE_slice_TID for session communications there between. The temporary identifier or authentication identifier used for session communications between the slice provider 220 and the infrastructure manager 230 may be stored in the slice provider 220.

The infrastructure manager 230 may be a manager entity for the infrastructure 240 and communicatively connected to the infrastructure provider 240. The infrastructure manager 230 and the infrastructure provider 240 mutually authenticate each other with support of the distributed trust third party 260. The infrastructure manager 230 and the infrastructure provider 240 may use a temporary identifier or authentication identifier such as UE_InfM_TID for session communications there between. The temporary identifier or authentication identifier used for session communications between the infrastructure manager 230 and the infrastructure provider 240 may be stored in the infrastructure manager 230.

The infrastructure provider 240 can be configured to provide network resources that enable network connectivity, communication, operations and management. The infrastructure provider 240 may be communicatively connected to the UE 250. The infrastructure provider 240 and the UE 250 mutually authenticate each other with support of the distributed trust third party 260. The infrastructure provider 240 and the UE 250 may use a temporary identifier or authentication identifier such as UE_Inf_TID for session communications there between. The temporary identifier or authentication identifier used for session communications between the infrastructure provider 240 and the UE 250 may be stored in the infrastructure provider 240.

The distributed trust third party 260 includes one or more AAA management functions 265. Each of the AAA management functions 265 may be indicative of AAAs in the distributed trust third party 260. The AAA management functions 265 via the distributed third party 260 may be communicatively connected to each of the service provider 210, slice provider 220, infrastructure manager 230, infrastructure provider 240 and UE 250. Each of the service provider 210, slice provider 220, infrastructure manager 230, infrastructure provider 240 and UE 250 may register with the AAA management functions 265. The AAA management functions 265 can enable the performance or support of various tasks like ID management, authentication, identification and authorization.

Figure 3:
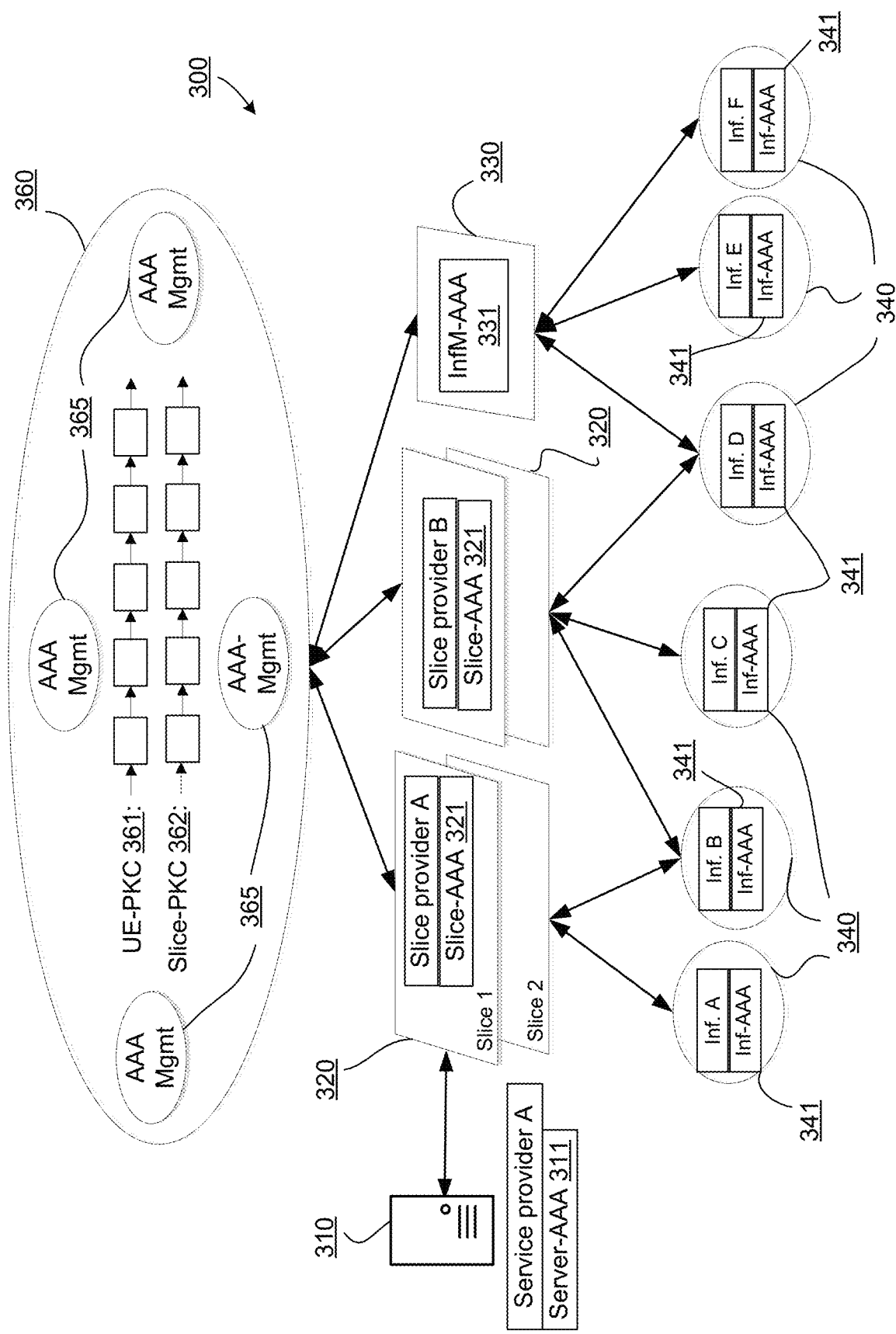
FIG. 3 illustrates the unified authentication architecture based on a distributed trust third party, in accordance with embodiments.

FIG. 3 illustrates the unified authentication architecture 300 based on a distributed trust third party, in accordance with embodiments of the present disclosure. The unified authentication architecture 300 includes a cloud chain layer, logical network layer, application layer, and infrastructure layer. The cloud chain layer may manage different chains (e.g. UE public key chain (UE-PKC)) which may record lists of transactions. The cloud chain layer may also perform UE ID management, for example providing a UE ID mapping information or mapping table. The cloud chain layer may perform verification actions for access authentication or run other verifications (e.g. blacklist management). The logical network layer may manage or control infrastructure provision and control, maintenance and provision of slices. The logical network layer may also perform verification for network access authentication or key management. The application layer may provide services and perform verification for service access authentication or key management. The infrastructure layer may provide physical infrastructure resources and provide network access authentication. According to embodiments, it may be considered that each domain in the same layer may not trust each other.

Referring to FIG. 3, the unified authentication architecture 300 includes one or more of the service provider 310, slice provider 320, infrastructure manager 330, infrastructure provider 340 and the distributed trust third party 360. In some embodiments, the unified authentication architecture 300 can further include other network entities and if these other network entities form a part of the unified authentication architecture 300, these other network entities are communicatively connected to the distributed trust third party 360.

Further referring to FIG. 3, the distributed trust third party 360 is communicatively connected to the slice provider 320 (e.g. slice provide A and slice provider B) and infrastructure manager 330. The distributed trust third party 360 may be a blockchain public key infrastructure (PKI) but it may be a trust party using other suitable authenticating technology. The service provider 310 may be a service provider and may be referred to as the service provider 310. The server or service provider 310 may be communicatively connected to the slice provider 320. Each of the slice provider 320 and the infrastructure manager 330 may be communicatively connected to one or more of the infrastructure providers 340 as illustrated in FIG. 3.

Further referring to FIG. 3, the server-AAA 311 is an authentication/authorization and key management function deployed by the service provider 310. The server-AAA 311 may or may not be placed with the service provider 310 in the same unit. Similarly, the slice-AAA 321 is an authentication/authorization and key management function deployed by the slice provider 320. The slice-AAA 321 may or may not be placed with the slice provider 320 in the same unit. The InfM 330 is an infrastructure controller or manager which may control or manage several infrastructure providers (e.g. Inf 340). The InfM-AAA 331 is an authentication/authorization and key management function deployed by the InfM 330. The InfM-AAA 331 may or may not be placed with the InfM 330 in the same unit. The Inf-AAA 341 is an authentication/authorization and key management function deployed by the infrastructure provider or Inf 340. The Inf-AAA 341 may or may not be placed with the Inf 340 in the same unit. The AAA management function 365 is an authentication/authorization and key management function in the distributed trust third party 360 (e.g. which can be configured to include blockchain).

According to embodiments, a UE (e.g. a mobile UE) may register with the AAA management function (e.g. AAA management function 365). In some embodiments, the registration process may be completed on site. For example, a user of the UE may bring identification proof to the AAA management function (e.g. AAA management function 365) for registration of the UE. In some embodiments, the registration process can be partly or entirely performed online. In one example, the UE may generate its own public/private key and submit the public key with its identification cipher to the AAA management function (e.g. AAA management function 365). The identification cipher may include one or more parameters, for example, UE's identification proofs, UE ID or UE application/network preference indicating network(s) or service(s) to which UE prefers to access. In another example, the AAA management function (e.g. AAA management function 365) may generate a public/private key set for the UE, and subsequently transmit the generated private key through secure communication to the UE. In some embodiments, to ensure this secure communication, the transmitting message containing the private key may be encrypted using a session key. This encryption using a session key can useful when the UE and the AAA management function are not in a trusted relationship. In some embodiments, the secure communication may use the public key generated by the UE or the AAA management function.

When the UE is registered at the AAA management function (e.g. AAA management function 365), the UE's public key or its corresponding certificate may be added into the UE-PKC. The network entities to which the UE is allowed to access (e.g. service provider 310, slice provider 320, infrastructure manager (InfM) 330, infrastructure provider (Inf) 340) may also be added into the UE-PKC. The UE's subscription may also be stored in the UE. The UE's subscription may include one or more parameters associated with the UE, which can include one or more of a list of infrastructure IDs and respective public key which are associated with the UE, a list of slice IDs and respective public key which are associated with the UE, a list of service IDs and respective public key which are associated with the UE, a list of Infrastructure manager IDs and respective public key which are associated with the UE, temporary UE ID or authentication ID generated by AAA management function with AAA management function's signature for indication of authorization to UE, AAA management function's public key or UE's public/private key. Other parameters associated with the UE would be readily understood by a worker skilled in the art.

Figure 4:
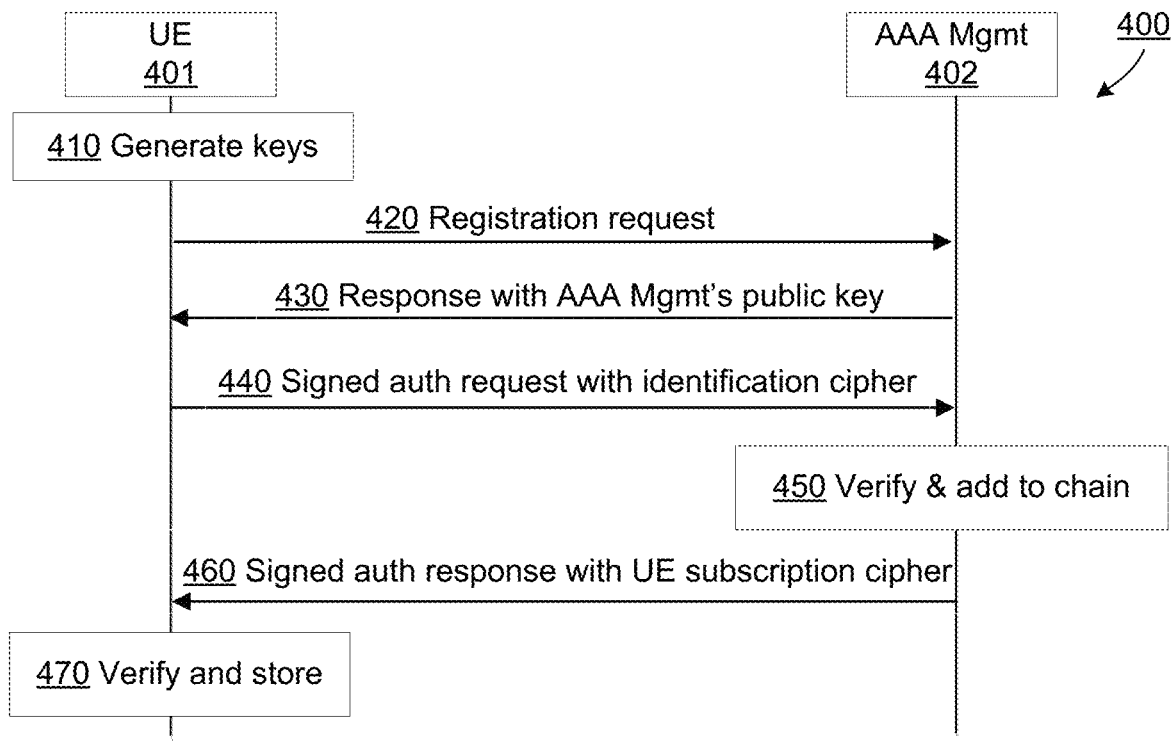
FIG. 4 illustrates a method of registering a user equipment (UE) online at an authentication authorization and accounting (AAA) management function in a distributed trust third party with public/private keys assigned to the UE, in accordance with embodiments.

FIG. 4 illustrates a method 400 of registering a UE online at an AAA management function in the distributed trust third party with public/private key generated by the UE, in accordance with embodiments of the present disclosure. Referring to FIG. 4, the UE 401, at step 410, generates its own public/private keys, UE ID or the certificate(s) corresponding to the public/private keys. The UE's public/private keys may be generated using for example elliptic curve cryptography (ECC) or other suitable method as would be readily understood. The generated UE ID may be a hash value of the UE's public key.

At step 420, the UE 401 transmits a request for registration to the AAA management function 402. The registration request may include a temporary number which identifies the user in the session communication or the public key of the UE 401 generated at step 410.

In response to the registration request, the AAA management function 402, at step 430, sends a response to the UE 401. The response includes the public key of the AAA management function 402. In some embodiments, the response may be encrypted using the public key of the UE 401, if the AAA management function 402 has the public key of the UE 401. In a situation where the UE 401 and the AAA management function 402 do not trust each other, the UE and AAA management function may mutually authenticate each other. For example, UE 401 and the AAA management function 402 may authenticate each other using an existing challenge-response method or other suitable method.

At step 440, the UE 401 transmits to the AAA management function 402 a signed authorization request with an identification cipher. The content of the identification cipher may include one or more parameters such as UE identification proof (e.g. drive license, passport, birth certificate, face-screening, or fingerprints), UE ID or UE application/network preferences which can indicate network(s) or service(s) to which the UE 401 prefers to access. In some embodiments, the identification cipher may be encrypted using the public key of the AAA management function 402. The authorization request can be signed using the private key of the UE 401 before being sent to the AAA management function 402.

Upon receipt of the signed authorization request, the AAA management function 402, at step 450, decrypts the identification cipher using its own private key (i.e. private key of the AAA management function 402). When the identification cipher is decrypted, the AAA management function 402 checks validity of the UE identification proof contained in the identification cipher. The validity of the UE identification proof can be confirmed through, for example, a global user information database from the government or other suitable means. Also, the AAA management function 402 verifies the signature of the UE 401. If the UE identification proof is valid and the signature of the UE 401 is verified, the AAA management function 402 stores at or adds to the UE-PKC the public key of the UE 401 and corresponding certificate or network entities that the UE 401 is allowed to access (e.g. service provider, slice provider, infrastructure manager (InfM) and infrastructure provider (Inf)).

The AAA management function 402, at step 460, may send the subscription cipher to the UE 401. The content of the subscription cipher may include one or more of a list of available infrastructure, a list of available slices, a list of available services, a list of available infrastructure managers, their corresponding current public keys, a temporary UE ID or authentication UE ID for the UE 401 (e.g. TB_ui) generated by the AAA management function 402, the signature of the AAA management function 402 for indication of the authorization to the UE 401, the AAA management function's public key and the UE's public/private key. In some embodiments, the parameters of signature of the AAA management function 402 may include the temporary UE ID or authentication UE ID for the UE 401 (e.g. TB_ui). The subscription cipher may be encrypted using the public key of the UE 401. At step 470, the UE 401 receives the subscription cipher and decrypts the received subscription cipher and stores the subscription.

Figure 5:
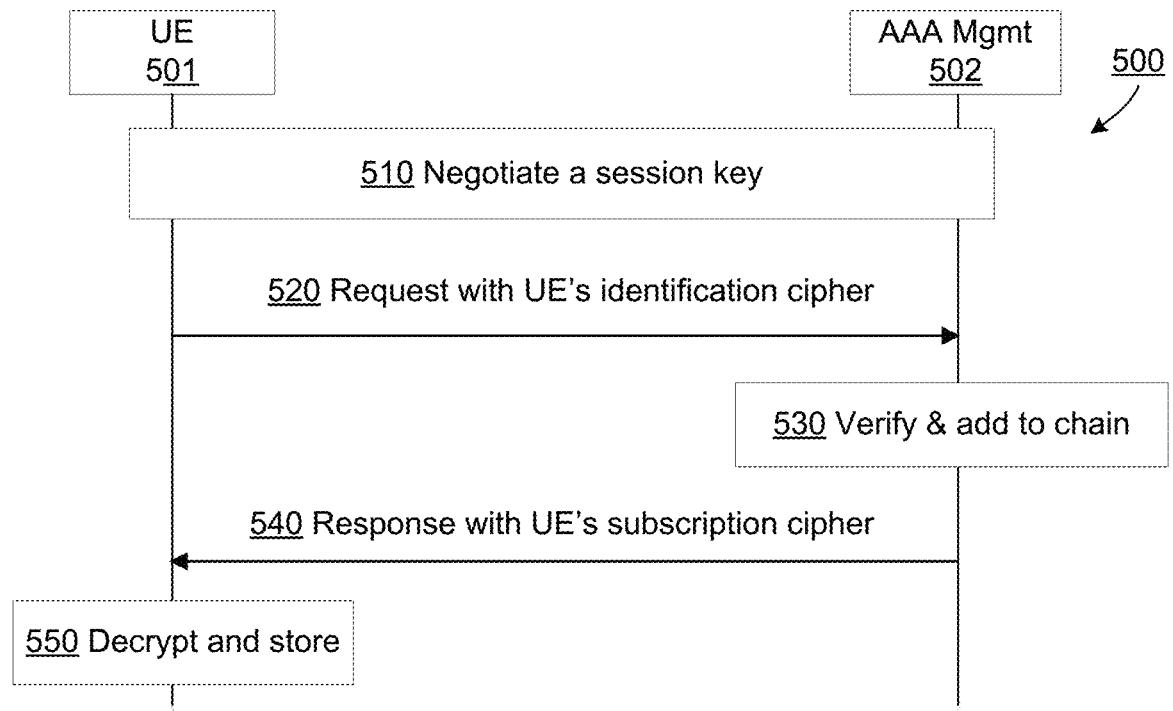
FIG. 5 illustrates another method of registering a UE online at an AAA management function in a distributed trust third party with public/private keys assigned to the UE, in accordance with embodiments.

FIG. 5 illustrates another method 500 of registering a UE online at an AAA management function in the distributed trust third party with public/private key generated by the UE, in accordance with embodiments of the present disclosure. Referring to FIG. 5, at step 510, the UE 501 and the AAA management function 502 first negotiate a session key for secure communication between them. In some embodiments, the session key may be negotiated using the Diffie-Hellman key exchange method or other suitable method as would be readily understood.

Upon negotiation, the UE 501, at step 520 sends a request for registration to the AAA management function 502. The registration request may include the UE's 501 identification cipher. The content of the identification cipher may include the UE's 501 identification proofs, UE ID or UE application/network preferences indicative of network(s) or service(s) to which the UE 501 prefers to access. The identification cipher may be encrypted using the negotiated session key.

Upon receipt of the registration request, the AAA management function 502, at step 530, decrypts the identification cipher and obtains the identification proof. When the identification proof is obtained, the AAA management function 502 checks validity of the UE identification proof. The validity of the UE identification proof can be confirmed through, for example, a global user information database from the government. If the UE identification proof is valid, the AAA management function 502 generates UE 501's public/private key with the corresponding certificate. Also, the AAA management function 502 stores in or adds into the UE-PKC the public key of the UE 501, the corresponding certificate, or network entities that the UE 501 is allowed to access (e.g. service provider, slice provider, infrastructure manager (InfM), infrastructure provider (Inf)).

Then, the AAA management function 502, at step 540, sends a response to the UE 501. The response includes the subscription cipher which may be encrypted using the session key. The content of the subscription cipher may include one or more of UE 501's public/private key, AAA management function's 502 public key, a list of available infrastructure, a list of available slices, a list of available services, a list of available infrastructure managers (InfM), their corresponding current public keys, a temporary UE ID or authentication UE ID for the UE 501 (e.g. TB_ui) generated by the AAA management function 502 and AAA management function's 502 signature for indication of the authorization to the UE 501. In some embodiments, the subscription cipher may be encrypted using the public key of the UE 501. At step 550, the UE 501 receives the subscription cipher and decrypts the received subscription cipher and stores the subscription.

Figure 6:
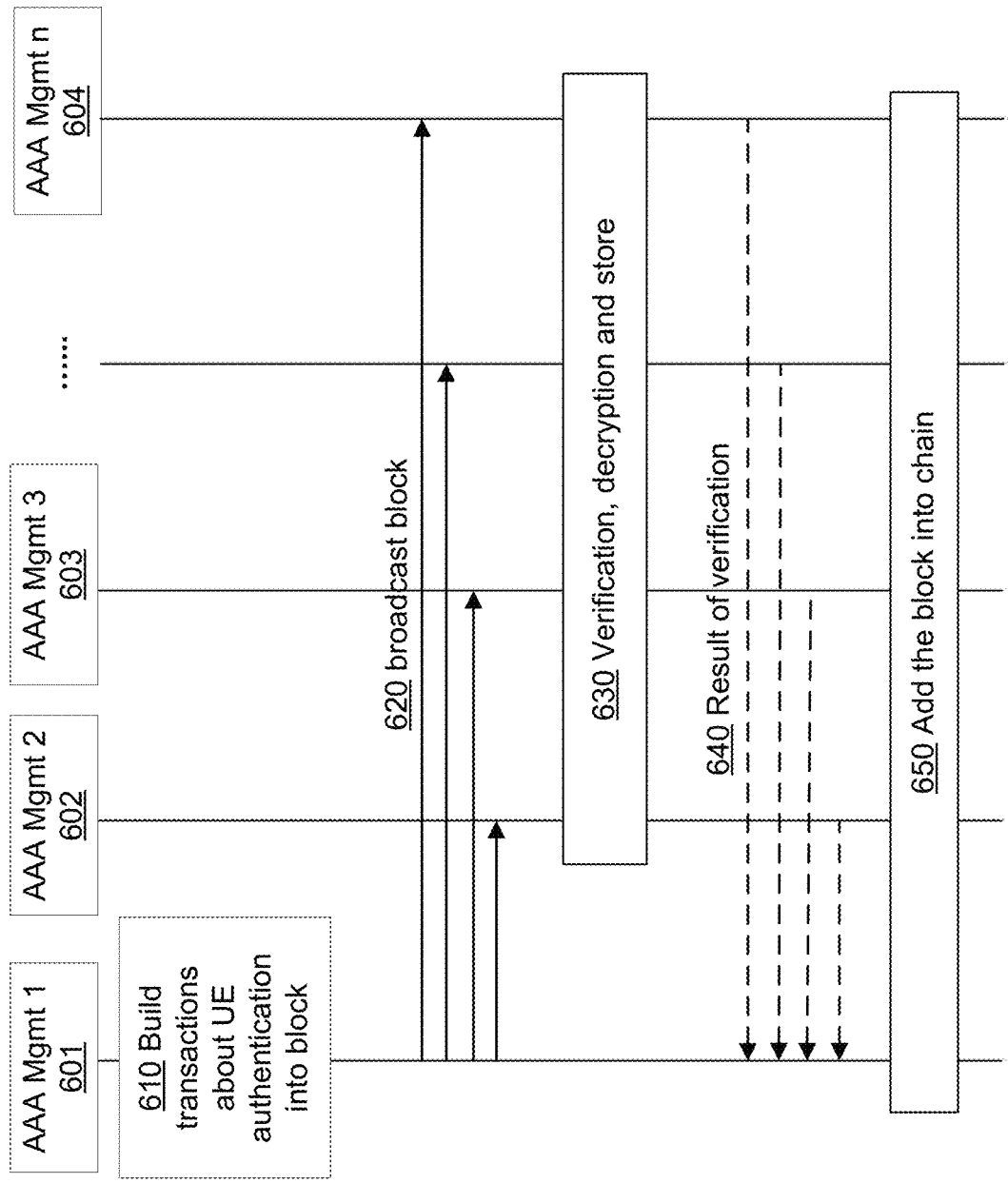
FIG. 6 illustrates a verification procedure by a plurality of AAA management functions, in accordance with embodiments.
Figure 7:
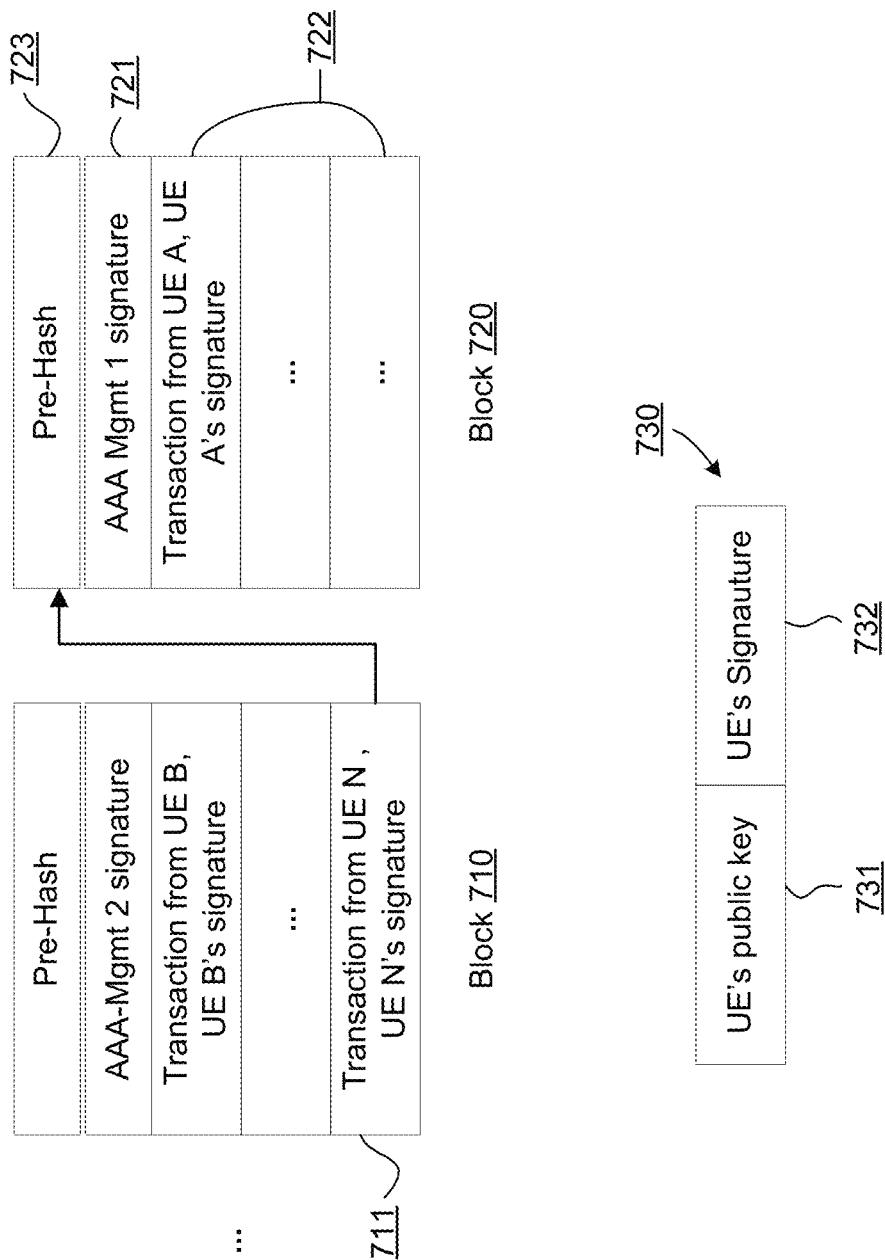
FIG. 7 illustrates a block added to UE-public key chain (PKC) during the verification procedure of FIG. 6, in accordance with embodiments.

According to embodiments, any AAA management function may add UE's public key, the corresponding certificate or network entities that the UE is allowed to access (e.g. service provider, slice provider, infrastructures manager (InfM), infrastructure provider (Inf)) into the UE-PKC if the UE's transaction passes verification, as is illustrated in FIG. 6. FIG. 6 illustrates a verification procedure 600 by a plurality of AAA management functions, in accordance with embodiments of the present disclosure. FIG. 7 illustrates a block added in UE-PKC during the verification procedure 600 of FIG. 6, in accordance with embodiments of the present disclosure.

Referring to FIGS. 6 and 7, at step 610, the AAA management function 1 601 builds a new block 720 with its own signature (AAA management function 1's 601 signature) and a list of verified transactions with UEs' corresponding signatures. The block 720 has basic fields such as version, timestamp, Meckler tree root. The block 720 may further include the AAA management function 1's 601 signature 721, a list 722 of UE's transactions with corresponding UE's signature (e.g. UE transaction 730). The content of the UE's transaction 730 may include one or more parameters such as UE's public key 731, UE's signature 732, other information related to security (e.g. public key's expiration time) or network entities that the UE requests for access (e.g. service provider, slice provider, infrastructure manager (InfM), infrastructure provider (Inf)). The pre-hash 723 of the block 720 may be referenced by the UE N's transaction 711.

Once block 720 is constructed, the AAA management function 1 610, at step 620, broadcasts the block to other AAA management functions such as the AAA management function 2 602, the AAA management function 3 603 and the AAA management function n 604. The block 720 may include one or more of the AAA management function 1 610's signature, UEs' signatures and UE transactions. According to embodiments, each of the AAA management functions (e.g. AAA management function 1 610, AAA management function 2 602, AAA management function 3 603, AAA management function n 604, etc.) may be placed in the same distributed trust third party (e.g. blockchain PKI).

When the AAA management function 2 602, the AAA management function 3 603, the AAA management function n 604 and other AAA management functions receive the broadcasted block 720 from the AAA management function 1 610, each of these AAA management functions, at step 630, verify the UE transaction(s) contained in the block 720.

The AAA management function 2 602, the AAA management function 3 603, the AAA management function n 604 and other AAA management functions that received the broadcasted block 720, at step 640, send the result of verification to the AAA management function 1 601.

After running consensus method(s) or algorithm(s) (e.g. Practical Byzantine Fault Tolerance (PBFT), proof-of-work (POW)), the block 720, at step 650, is added into UE-PKC. As stated above, the block 720 has basic fields for example, version, timestamp, Merkler tree root.

According to embodiments, a slice provider can create or maintain a network slice. The slice provider may register with the AAA management function first in order to verify the network slice information submitted to the AAA management function(s) and add into the public key chain for the slice. In some embodiments, the registration process may be completed on site. In some embodiments, the registration process can be partly or entirely performed online. The online registration process for the slice provider may be essentially similar to that for the UE illustrated in FIGS. 4 and 5. Upon registration, the slice provider has its own public key/private key along with AAA management function's public key. The AAA management function may have the slice provider's public key, the slice provider's other information (e.g. slice provider ID), or both.

After being registered at the AAA management function, the slice provider requests slice-AAA (e.g. slice-AAA deployed by the slice provider) to generate a pair of public/private keys for each slice. Then, the slice-AAA may encrypt a request transaction, wherein encryption can be enabled using signcrypt or other cryptographic technique. The request transaction may include slice ID, slice's public/private keys, the corresponding certificate, slice provider ID, slice's application/network preference indicative of service(s) or network slice to which the network slice prefers to use. The slice-AAA submits the encrypted request transaction to the AAA management function for verification.

Upon verification, the AAA management function adds the slice's public key or corresponding certificate into the slice-PKC. The AAA management function sends a response which may include slice's subscription. The slice's subscription may include one or more parameters such as the AAA management function's public key, a list of infrastructure, a list of service and their public key. A block in the slice-PKC may include one or more parameters such as slice ID.

According to embodiments, the slice's public/private key may need to be updated periodically due to dynamic network slice changes. The public/private key update may be triggered by slice-AAA sending a slice's public/private key update message to the AAA management function. The public/private key update message may include the new slice's public key (updated public key), slice ID or both. This update message may be signed using the old slice's private key. The AAA management function receives the update message and verifies the signature using the old slice's public key. When successfully verified, the AAA management function constructs a valid block and adds it into the slice-PKC. The AAA management function may send a response indicative of the results of the public key update to the slice-AAA.

According to embodiments, an Infrastructure manager may register itself with the AAA management function. In some embodiments, the registration process may be completed on site. In some embodiments, the registration process can be partly or entirely performed online. The online registration process for the Infrastructure manager may be essentially similar to that for the UE illustrated in FIGS. 4 and 5. Upon registration, the infrastructure manager has its own public key/private key along with AAA management function's public key. The AAA management function may have the infrastructure manager's public key, the infrastructure manager's other information (e.g. InfM ID), or both. The AAA management function also adds the infrastructure manager's public key, infrastructure manager's other information (e.g. InfM ID), or both into the InfM-PKC.

According to embodiments, the infrastructure manager's identification cipher may include one or more parameters, for example, identification proofs and infrastructure manager's application/network preference indicative of service(s) or network slice to which the infrastructure manager prefers to use. The infrastructure manager's subscription cipher may include one or more parameters, for example, the AAA management function's public key, a list of infrastructure providers, a list of service and their public key. A block in InfM-PKC may include one or more parameters such as InfM ID.

According to embodiments, the infrastructure manager's public/private key may need to be updated. The update of the infrastructure manager's public/private key may be triggered by the infrastructure manager sending an infrastructure manager's public/private key update message to AAA management function. The public/private key update message may include a new infrastructure manager's public key which is signed by the old infrastructure manager's private key before sending to the AAA management function. The AAA management function verifies the infrastructure manager's signature using the infrastructure manager's old public key and adds the verified infrastructure manager's signature into the InfM-PKC.

According to embodiments, a service provider or a server may register itself to the AAA management function. In some embodiments, the registration process may be completed on site. In some embodiments, the registration process can be partly or entirely performed online. The online registration process for the service provider may be essentially similar to that for the UE illustrated in FIGS. 4 and 5. Upon registration, the service provider has its own public key/private key along with AAA management function's public key. The AAA management function may have the service provider's public key, the service provider's other information (e.g. service provider ID), or both. After being registered with the AAA management function, the service provider requests server-AAA (e.g. server-AAA deployed by the service provider) to generate a pair of public/private keys for each service and to add the service's public key into the server-PKC.

Upon verification, the AAA management function adds the service's public key, the service's other information (e.g. service ID), or both into the server-PKC. The service's subscription may be provided to the server-AAA. The service's subscription may include one or more parameters, for example, the AAA management function's public key, a list of infrastructures providers (Inf), a list of network slices or infrastructure managers (InfMs), and their respective public keys.

According to embodiments, the service's public/private key may need to be updated. The public/private key update may be triggered by server-AAA sending a service's public/private key update message to the AAA management function. The public/private key update message may include the service's new public key (updated public key), the service ID or both. This update message may be signed using the service's old private key before sending to the AAA management function. The AAA management function receives the update message and verifies the signature using the service's old public key. When successfully verified, the AAA management function adds the service's new public key into the server-PKC.

According to embodiments, an infrastructure provider may register itself with the AAA management function. In some embodiments, the registration process may be completed on site. In some embodiments, the registration process can be partly or entirely performed online. The online registration process for the infrastructure provider may be essentially similar to that for the UE illustrated in FIGS. 4 and 5. Upon registration, the infrastructure provider has its own public key/private key along with AAA management function's public key. The AAA management function may have the infrastructure provider's public key, the infrastructure provider's other information (e.g. infrastructure provider ID), or both. After being registered at the AAA management function, the infrastructure provider requests Inf-AAA (e.g. Inf-AAA deployed by the infrastructure provider) to generate a pair of public/private keys for each infrastructure provider and to add the infrastructure provider's public key into the chain (e.g. Inf-PKC).

Upon verification, the AAA management function adds the infrastructure provider's public key, the infrastructure provider's other information (e.g. Inf ID), or both into the Inf-PKC. The infrastructure provider's subscription may be provided to the Inf-AAA. The infrastructure provider's subscription may include one or more parameters, for example, the AAA management function's public key, a list of services, a list of network slices or infrastructure managers (InfMs), and respective public keys.

Figure 8:
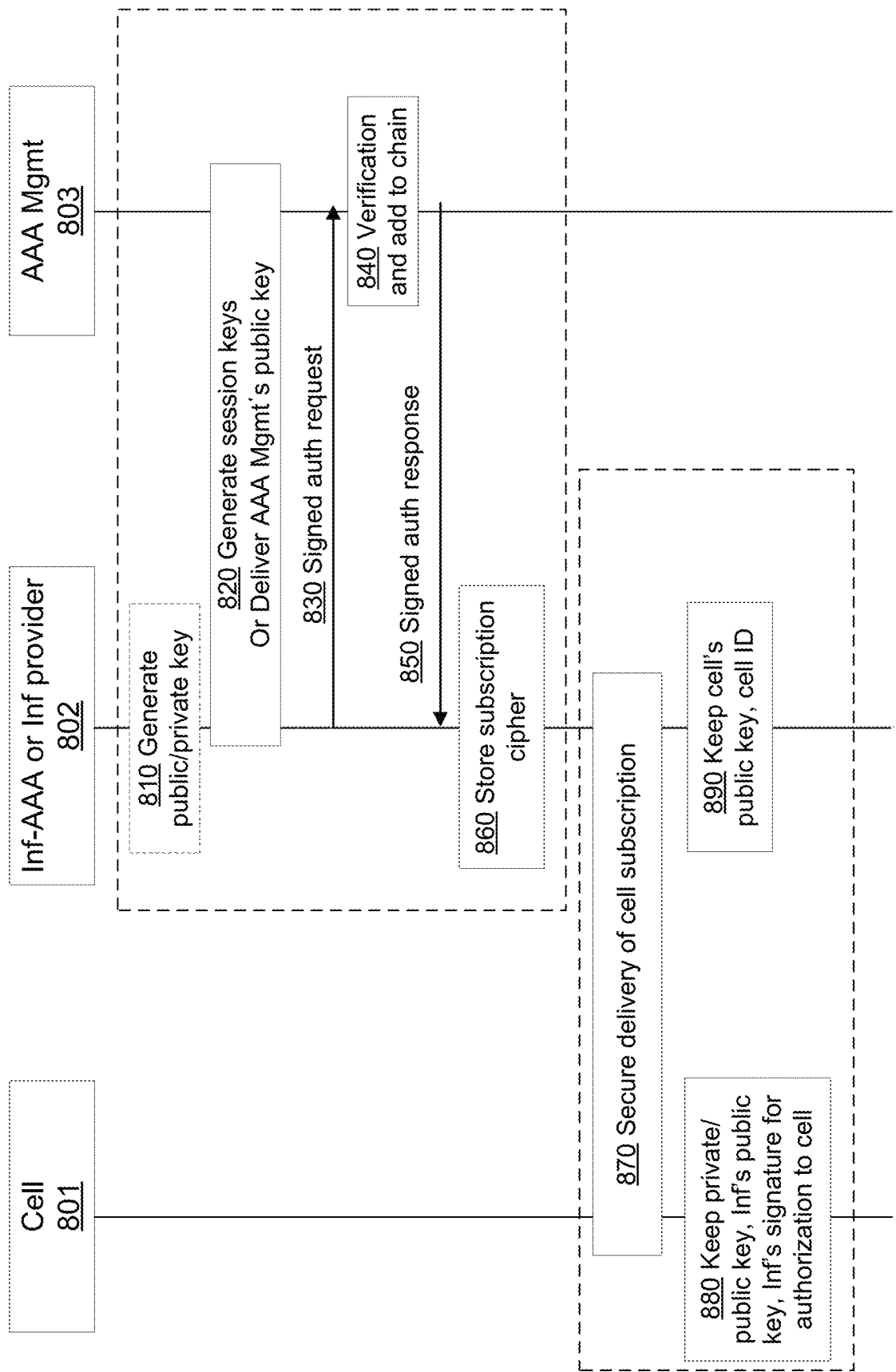
FIG. 8 illustrates a method of cell and infrastructure provider registration in accordance with embodiments.

Subsequently, one or more of the Inf-AAA's public key, cell's public key and the infrastructure provider's signature for authorization to UE may be delivered to the cell in a secure communication as illustrated in FIG. 8. Thus, the cell (or base station) may hold one or more of the infrastructure provider's public key, its own public/private key and the infrastructure provider's signature for authorization to UE.

According to embodiments, the infrastructure provider's public/private key may need to be updated. The public/private key update may be triggered by Inf-AAA sending an infrastructure provider's public/private key update message to the AAA management function. The public/private key update message may include the infrastructure provider's new public key (e.g. updated public key), the infrastructure provider ID or both. This update message may be signed using the infrastructure provider's old private key before sending to the AAA management function. The AAA management function receives the update message and verifies the signature using the infrastructure provider's old public key. When successfully verified, the AAA management function adds the infrastructure provider's new public key into the Inf-PKC.

FIG. 8 illustrates a method 800 of cell and infrastructure provider registrations in accordance with embodiments of the present disclosure. Referring to FIG. 8, the Inf-AAA or Inf provider 802, at step 810, generates its own public/private keys. At step 820, the Inf-AAA or Inf provider 802 and the AAA management function 803 generate or negotiate a session key for secure communication. The AAA management function 803 transmits the AAA management function's 803 public key to the Inf-AAA or Inf provider 802.

At step 830, the Inf-AAA or Inf provider 802 transmits to the AAA management function 803 a signed auth request with the identification cipher. The content of the identification cipher may include one or more parameters such as identification proof, Inf ID or Inf application/network preferences indicating network(s) or service(s) to which the Inf-AAA or Inf provider 802 prefers to use. In some embodiments, the identification cipher may be encrypted using the public key of the AAA management function 803. The authorization request is signed using the private key of the Inf-AAA or Inf provider 802 before sending to the AAA management function 803.

Upon receipt of the signed auth request, the AAA management function 803, at step 840, may decrypt the identification cipher using its own private key (i.e. private key of the AAA management function 803). When the identification cipher is decrypted, the AAA management function 803 verifies the signature of the infrastructure provider associated with the Inf-AAA or Inf provider 802. If the signature of the infrastructure provider is verified, the AAA management function 803 stores at or adds into the Inf-PKC the public key of the infrastructure provider.

Then, the AAA management function 803, at step 850, sends a signed auth response including the subscription cipher to the Inf-AAA or Inf provider 802. The content of the subscription cipher may include one or more of the AAA management function's 803 public key, a list of services, a list of network slices or infrastructure managers (InfMs), and their public keys. In some embodiments, the subscription cipher may be encrypted using the public key of the Inf-AAA or Inf provider 802. At step 860, the Inf-AAA or Inf provider 802 receives the subscription cipher and decrypts the received subscription cipher and stores it locally.

Then, at step 870, registration of the cell 801 takes place and subscription cipher is securely delivered to the cell 801, in a similar manner to steps 820 to 850. As a result, the cell 801, at step 880, keeps its public/private key and the infrastructure provider's public key. In some embodiments, the cell 801 may also keep the Inf provider's 802 signature for authorization to the cell 801. The Inf-AAA or Inf provider 802, at step 890, keeps the cell's 801 public key and the cell's 801 ID. In some embodiments, the order of steps 880 and 890 may be not important. In some embodiments, steps 880 and 890 take place simultaneously. In some embodiments, steps 880 and 890 occur sequentially or reversed or with a delay there between.

According to embodiments, any AAA management function in the distributed trust third party (e.g. blockchain PKI) can be an administrator. For instance, the government office or AAA management function with authority to check user' identity may be an administrator and therefore verify the identification proofs (e.g. drive license, passport, birth certificate, face-screen, finger prints). The administrator can have several functions. The administrator may create or maintain various chains (e.g. authentication chains) and also generate a genesis block for each chain. The genesis block can include policies for smart contracts or transaction approval protocols. In some embodiments, the genesis block may be empty. The administrator may add or delete members which are invited by administrator or verified by other members. The members may be AAA management functions. The administrator may also perform functions of the members such as querying and verifying network entities (e.g. UE, slice provider, InfM, service provider, and infrastructure provider) and creating and verifying transactions from individuals, blocks from members, or administrators.

Figure 9:
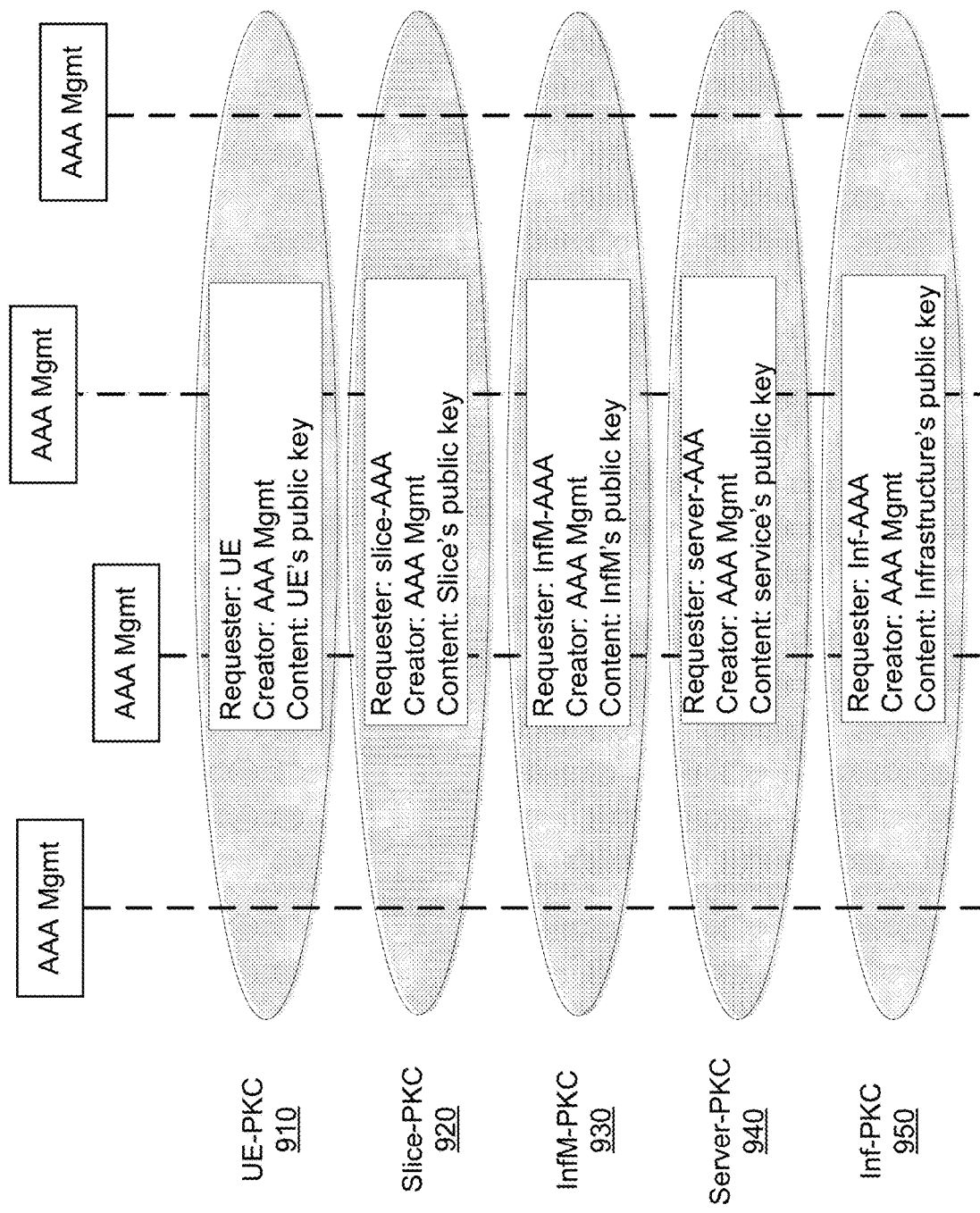
FIG. 9 illustrates various types of chains in a distributed trust third party, in accordance with embodiments.

According to embodiments, the administrator creates or maintains various chains (e.g. authentication chains). FIG. 9 illustrates various types of chains in the distributed trust third party, in accordance with embodiments of the present disclosure. The UE-PKC 910 may have one or more parameters, for example public key or the corresponding certificate. The UE's public key may be queried by slice-AAA, slice provider, InfM-AAA or AAA management function. The slice-PKC 920 may have one or more parameters, for example the slice's ID, the slice's public key or the corresponding certificate in the chain. The InfM-PKC 930 may have one or more parameters, for example the infrastructure manager's ID (InfM's ID), the InfM's public key or the corresponding certificate in the chain. The server-PKC 940 may have one or more parameters, for example the server's ID, the server's public key or the corresponding certificate in the chain. The Inf-PKC 950 may have one or more parameters, for example the infrastructure provider's ID (Inf's ID), the Inf's public key or the corresponding certificate in the chain. According to embodiments, if one or more of the slice's public key, the InfM's public key, the server's public key and the infrastructure provider's public key are expired or compromised, the expired or compromised public key may be refreshed with the new public key. In some embodiments, the new public key may be signed using its old private key and sent to the AAA management function or other members that hold the expired or compromised public key.

It is known that network entities, due to untrusted relationship there between, are often impacted by malicious behaviors of threat actors such as fake cells, fake infrastructure providers, fake application servers and fake slice providers. According to embodiments, mutual authentication can be provided to network entities during initial access to network/service, thereby reducing heavy communication overhead in the network systems. In various embodiments, UE's temporary IDs or UE's authentication ID are used for communication with various network entities thereby enabling the UE's sensitive information only at a trust third party. The use of a temporary ID (or UE's authentication ID) and mutual authentication can enable effective UE ID management, alleviate issues related to UE ID privacy and network security, and provide advantages like protection from DoS attack, fake cell detection, roaming-free and less communication overhead and delay.

Figure 10:
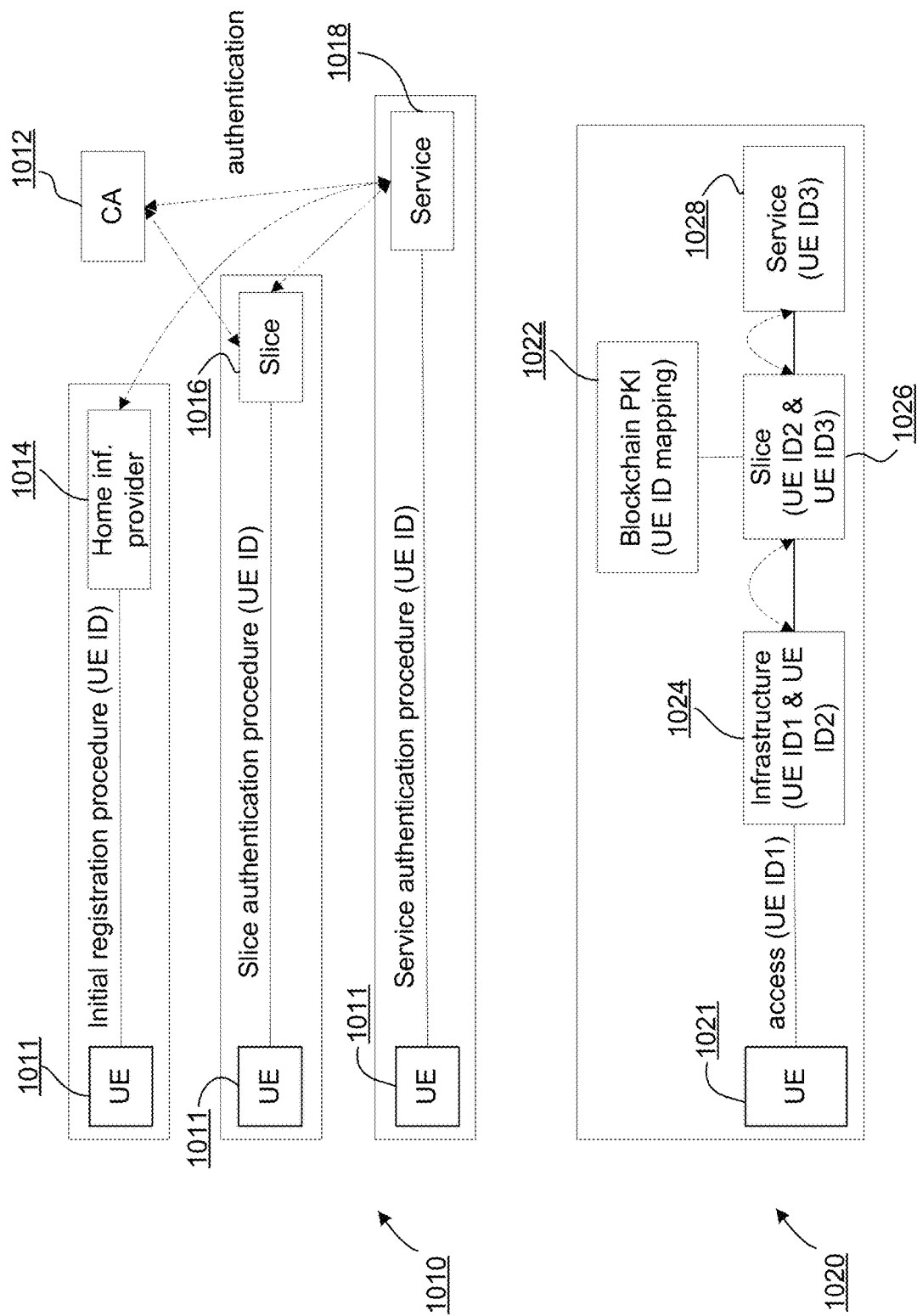
FIG. 10 illustrates identifier (ID) management during access authentication process in current systems and in an authentication architecture according to embodiments.

FIG. 10 illustrates ID management during access authentication process in current systems and in the authentication architecture of embodiments of the present disclosure. In a current system 1010, UE ID is kept in network functions (e.g. SUPI in AMF or UDM) during access authentication processes (e.g. network access authentication, slice access authentication or service access authentication procedure). For instance, the UE ID may be transmitted from the UE 1011 to the home infrastructure provider 1014 during the initial registration procedure, from the UE 1011 to the slice provider 1016 during the slice authentication procedure, and from the UE 1011 to the service provider 1018 during the service authentication procedure. During these authentication procedures, the UE ID may be disclosed or exposed to other network entities. Moreover, user sensitive information (e.g. user credentials) is kept in servers, for example UDM in home operator or third party servers. As these servers often become the target of threat actors (e.g. fake cells), there can be security issues or undesirable consequences which may include user privacy disclosure.

A further problem of current system 1010 is that separate authentications using a central authority (e.g. central root CA 1012) may be required due to an untrusted relationship between network participators or entities. For instance, each network entity such as home infrastructure provider 1014, slice provider 1016 and service provider 1018 may need to be separately authenticated using the central root CA 1012. In some cases when slice specific authentication is required, the authentication may proceed through operation of a home public land mobile network (hPLMN). The separate authentications may result in long delays and heavy overhead in communication network. Moreover, a large burden can be placed on the central root CA 1012 due to heavy certificate revocation for certificates like X.509 certificate.

In order to diminish at least some disadvantages of the current system, there is provided a method of ID management during access to network or service. According to embodiments, a temporary UE ID or authentication UE ID, which is different from the real original ID of the UE, is used for communications between network entities. For instance, a temporary UE ID or authentication UE ID (e.g. UE ID1) may be used for the communication between the UE 1021 and the infrastructure provider 1024, a different temporary UE ID or authentication UE ID (e.g. UE ID2) may be used for the communication between the infrastructure provider 1024 and the slice provider 1026, and another different temporary UE ID or authentication UE ID (e.g. UE ID3) may be used for the communication between the slice provider 1026 and the service provider 1028. The distributed trust third party 1022 (e.g. which can maintain blockchain PKI) manages these temporary IDs or authentication IDs and performs tasks related to ID mapping information. According to embodiments, mutual authentications for a participator, entity or role (e.g. UE 1021, infrastructure provider 1024, slice provider 1026, service provider 1028, cell or base station) can be provided with support of the distributed trust third party 1022 (e.g. blockchain PKI). Such use of a temporary UE ID or authentication UE ID for network communication can alleviate issues related to UE ID privacy and network security, and provide roaming-free and less communication overhead and delay.

Figure 11:
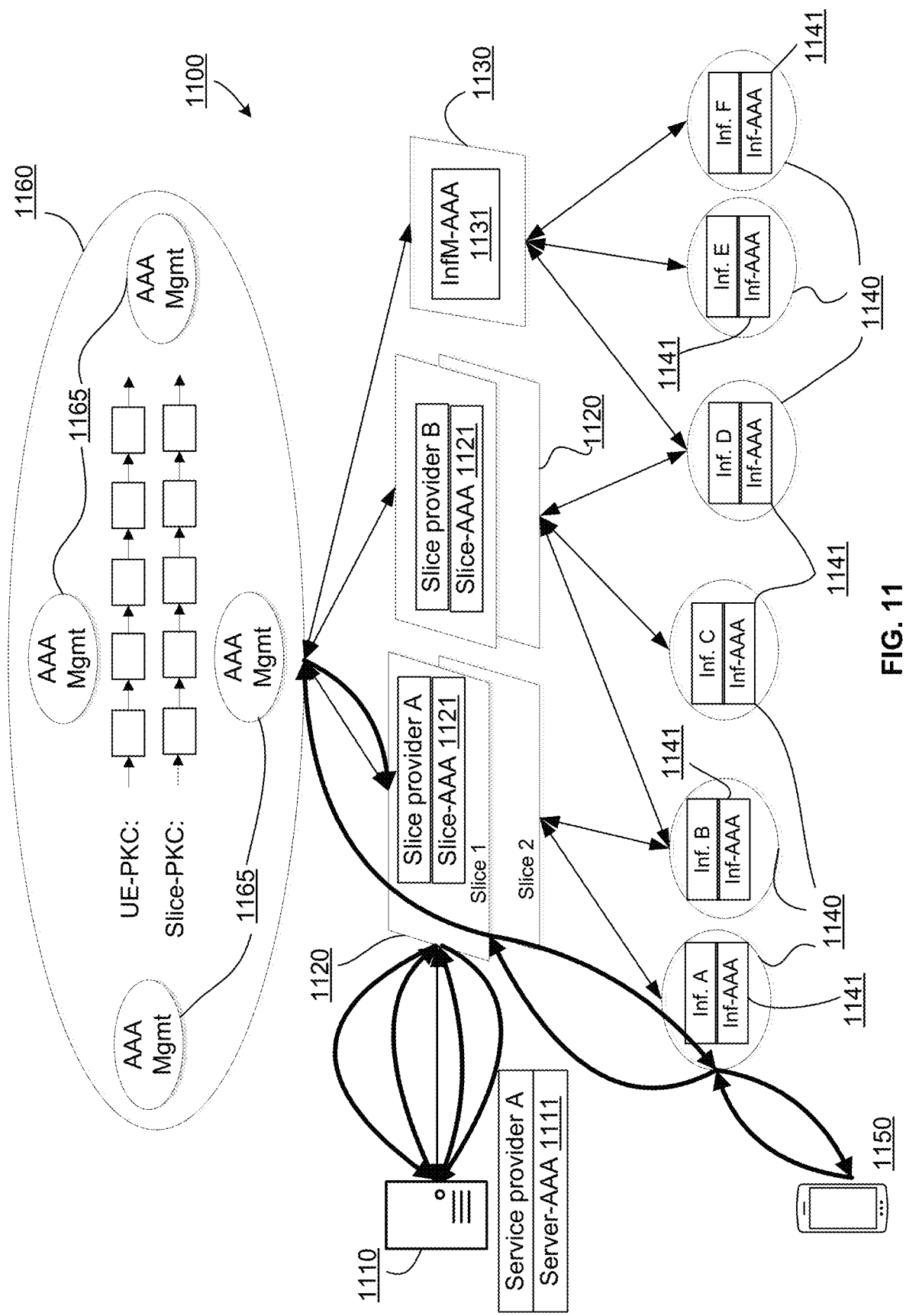
FIG. 11 illustrates ID management during initial access authentication process of a mobile UE, in accordance with embodiments.

FIG. 11 illustrates an ID management during mobile UE initial access authentication process, in accordance with embodiments of the present disclosure. The unified authentication architecture 1100 is similar to the unified authentication architecture 300 illustrated in FIG. 3.

Referring to FIG. 11, the UE 1150 may send an initial registration request to the network. This initial registration request message may be signed using the private key of the UE 1150. This request may include one or more parameters such as the UE's 1150 temporary ID or authentication ID (e.g. TB_ui), UE's real ID, UE's network/service preference indicative of network(s) or service(s) to which the UE 1150 prefers to elect or access. The one or more parameters may be encrypted using the AAA management function's 1165 public key or AAA management function's 1165 signature indicative of authorization to the UE 1150. The AAA management function 1165 is an authentication/authorization and key management function in the distributed trust third party 1160 (e.g. provisioned by use of blockchain). In various embodiments, the UE's temporary ID or authentication ID (e.g. TB_ui) may be obtained from the AAA management function 1165. In some embodiments, the UE's temporary ID or authentication ID (e.g. TB_ui) may be input parameters for generating other (temporary) IDs and may be used only one time. The UE's network/service preference may be determined based on one or more factors such as the corresponding charging fee agreement or other agreements.

For example, the UE's request is firstly sent to the slice provider 1120, the slice-AAA 1121 or the InfM-AAA 1131 through the infrastructure provider 1140 or Inf-AAA 1141. Then, the UE's request may be transmitted to the service provider 1110 or the server-AAA 1111. Then, the UE's request may be transmitted back to the slice provider 1120, the slice-AAA 1121 or the InfM-AAA 1131, and then finally sent to the AAA management function 1165.

According to embodiments, each role, participator or entity in the unified authentication architecture 1100 (e.g. UE 1150, infrastructure provider 1140, Inf-AAA 1141, InfM 1130, InfM-AAA 1131, slice provider 1120, the slice-AAA 1121, service provider 1110, server-AAA 1111) signs the UE's request using its own private key. Moreover, each of these entities generates a temporary ID or authentication ID for the UE 1150. For instance, the infrastructure provider 1140 or Inf-AAA 1141 may generate UE_Inf_TID, the slice provider 1120, the slice-AAA 1121 or the InfM-AAA 1131 may generate UE_slice/InfM_TID, and the service provider 1110 or the server-AAA 1111 may generate UE_server_TID. Each of the temporary IDs or authentication IDs assigned to UE 1150 may be encrypted using AAA management function's 1165 public key.

According to embodiments, the AAA management function 1165 decrypts ciphers and verifies all signatures. Upon successful verification, the AAA management function 1165 creates or updates the temporary ID mapping information or authentication IDs mapping information (e.g. mapping table) for the UE 1150 (e.g. mapping information (e.g. mapping table) of the temporary ID or authentication ID to the real UE ID of the UE 1150). The AAA management function 1165 also generates a subscription for each role, participator or entity in the unified authentication architecture 1100. The UE's subscription may include one or more parameters, such as UE ID mapping information, (e.g. mapping table), UE's temporary session key for secure communication with each entity, a list of allowed infrastructure providers 1140, Infrastructure managers 1130, slice providers 1120, servers or service providers 1110, and their public keys, and a list of available infrastructure providers 1140, infrastructure managers (InfM) 1130, slice providers 1120, servers or service providers 1110 and their public keys. The infrastructure provider's 1140 subscription may include one or more parameters, such as temporary UE ID or authentication UE ID generated by the InfM 1130 or the slice provider 1120, UE's service preference, UE's temporary session key for communication with UE 1150, a list of allowed InfMs 1130, slice providers 1120, servers or services 1110, and their public keys, and a list of available InfMs 1130, slice providers 1120, servers or service providers 1110, and their public keys. The infrastructure manager's 1130 subscription or the slice provider's 1120 subscription may include one or more parameters, such as temporary UE IDs or authentication UE IDs generated by infrastructure provider 1140 or server 1110, UE's service preference, UE's temporary session key for communication with the UE 1150, a list of allowed infrastructure providers 1140, servers or service providers 1110 and their public keys, and a list of available infrastructure providers 1140, servers or service providers 1110 and their public keys. The server or service provider 1110's subscription may include one or more parameters, such as temporary UE ID or authentication UE ID assigned by server 1110, UE's service preference, UE's temporary session key for communication with UE 1150, a list of allowed infrastructure providers 1140, infrastructure managers 1130, slice providers 1120 and their public keys, and a list of available infrastructure providers 1140, infrastructure managers 1130, slice providers 1120 and their public keys. According to embodiments, the subscriptions recited above may be encrypted using the public key of each entity and signed using the private key of the AAA management function 1165. The AAA management function 1165 sends the subscription cipher containing the subscription back to each entity.

According to embodiments, when each entity or function receives the subscription cipher, they verify and decrypt the received subscription cipher and obtain their subscriptions contained in the subscription cipher. Each entity or function may generate a signature indicative of authorization to the UE 1150. Each entity or function may send the generated signature to the UE 1150. In some embodiments, each entity or function may generate a UE's service subscription based on UE's profile preference. The UE's service subscription may be encrypted using the UE's temporary session key. The UE's service subscription may include one or more parameters such as agreement about resource or charging ways, or a corresponding random ID to identify the UE 1150 in the slice-AAA 1121 or the slice provider 1120 or the infrastructure controller or manager 1130, (e.g. TK_ss) or other corresponding random ID to identify the UE 1150 in the server 1110 (e.g. TK_is). After receiving the subscription cipher, the UE 1150 verifies and decrypts the received subscription cipher and obtains its subscription from the decrypted subscription cipher. The UE 1150 may store the subscription and the temporary UE ID (or authentication UE ID) locally.

According to embodiments, entities for example the infrastructure provider 1140 and the UE 1150 can detect fake cells thereby connecting only to authorized (legal) cells. During the initial access procedure, fake cells may be detected and identified by the UE 1150 through the infrastructure provider's 1140 signature indicative of authorization to cells. The discovery of a fake cell may be done before the RACH procedure. For example, using a current technique (e.g. X.509 certificate), the UE 1150 can verify the cell's certificate which is pre-installed by a root CA using the root CA's public key. The cell's certificate may be included in a system information broadcast message. In case of a fake UE, fake UEs (e.g. non-registered UEs) may be detected by the infrastructure provider 1140 using the AAA management function's 1165 signature indicative of authorization of the UE.

According to embodiments, to avoid DoS attacks launched by fake UEs or other malicious activities of fake cell towers (e.g. a modified cell tower with a malicious operator), the infrastructure provider 1140 may verify the AAA management function's 1165 signature for the UE 1150. Using such verifications, the infrastructure provider 1140 can ensure whether the UE 1150 is registered to the AAA management function 1165 or the UE 1150 is authorized (legal). In some cases, the infrastructure provider 1140 may obtain the UE's temporary ID or authentication ID (e.g.

TB_ui) from the AAA management function 1165 after the infrastructure provider 1140 is registered.

The UE ID may be encrypted using the AAA management function's public key in order to protect confidentiality of UE ID from air-interface attacks. According to embodiments, temporary UE ID or authentication UE ID can be similarly encrypted using AAA management function's public key or UE's temporary session key. To avoid conflicts with other temporary IDs or authentication IDs, a temporary UE ID or authentication UE ID may linked with TB_ui (e.g. used one-time) obtained from the AAA management function, in accordance with some functions. Signatures indicative of authorization of a UE can be used to avoid invalid (illegal) UEs that may launch DoS attacks on infrastructure providers. Subscriptions may be encrypted to protect confidentiality. Messages can be signed to protect integrity and non-repudiation. Infrastructure provider's signature for authorization to cells can be used to avoid fake cells. The procedure of fake cell detection may be performed during RRC-connection setup.

Figure 12:
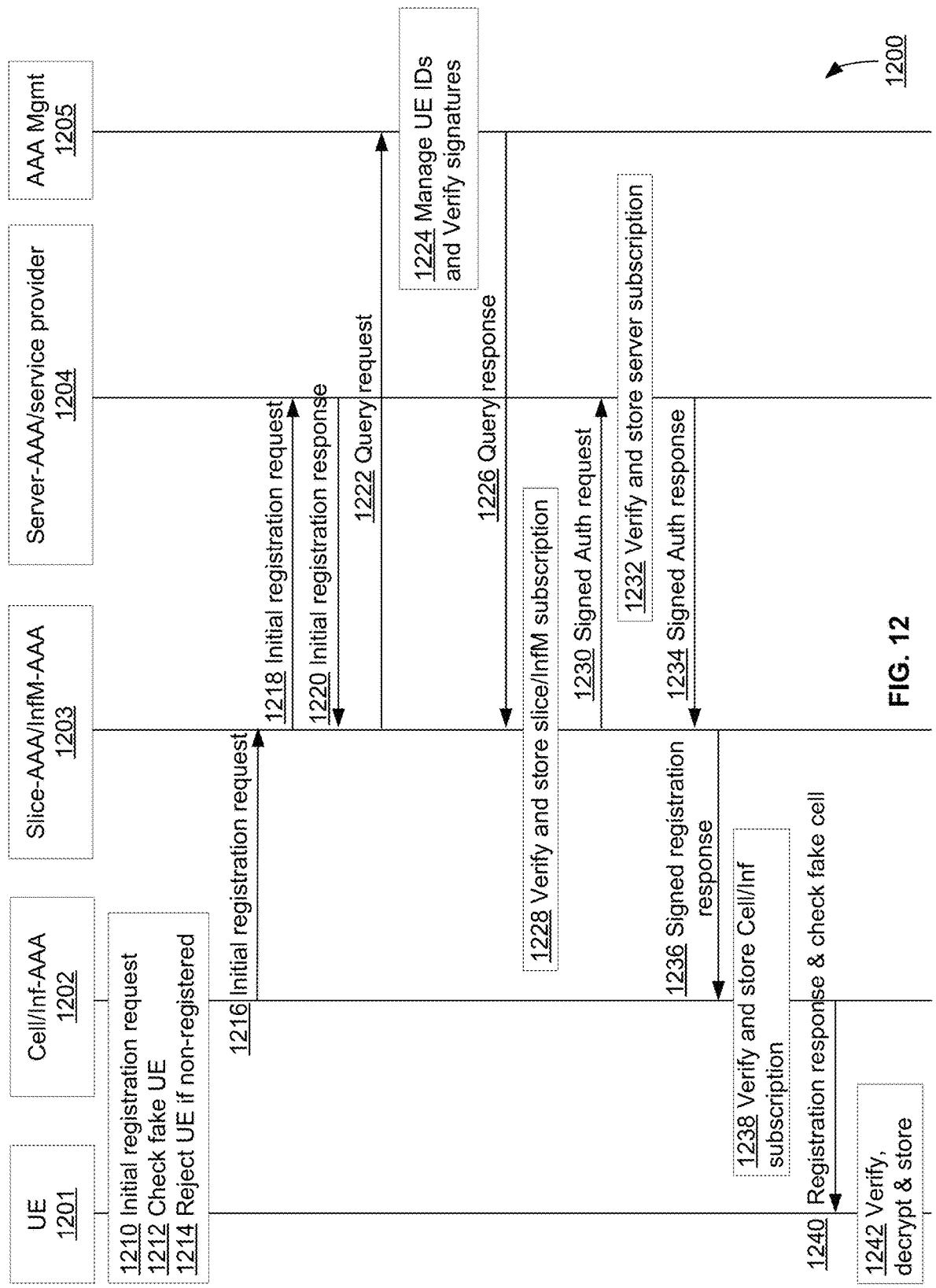
FIG. 12 illustrates a method of initial access authentication for a mobile UE, in accordance with embodiments.

FIG. 12 illustrates a method 1200 of initial access authentication for a mobile UE, in accordance with embodiments of the present disclosure. According to embodiments, when the UE 1201 initially accesses to the network, the UE 1201, at step 1210, sends an initial registration request to the Inf-AAA 1202, infrastructure provider or mobility management function in the infrastructure. At step 1212, the Inf-AAA 1202 (or infrastructure provider or mobility management function) receives the initial registration request message. Upon receipt of the initial registration message, the Inf-AAA 1202 may verify whether the UE 1201 is valid and is not a threat actor (e.g. fake UE). If the validity of the UE 1201 is successfully verified, the UE 1201 is already registered. In such case, the step 1216 may be performed without performing step 1214. If the UE 1201 is not verified, the UE 1201, at step 1214, may be notified that the UE 1201 is not registered.

At step 1216, the Inf-AAA 1202 (or infrastructure provider or mobility management function) generates the UE's future temporary ID or authentication ID (e.g. UE_Inf_TID). The UE's future temporary ID or authentication ID may be used for the UE's 1201 identification in future communications with the Inf-AAA 1202 (or infrastructure provider or mobility management function). The UE's future temporary ID or authentication ID may be encrypted using the AAA management function's 1205 public key. When the UE's future temporary ID or authentication ID is generated and encrypted, the Inf-AAA 1202 sends the request message to the slice-AAA/InfM-AAA 1203 or the slice provider.

The request message may include one or more of the UE 1201's temporary ID or authentication ID obtained from AAA management function (e.g. TB_ui), the Inf-AAA 1202's ID and signature (or those of the infrastructure provider or mobility management function), the UE's signature, the UE's service preference and the encrypted UE's future temporary ID or authentication ID. In some embodiments, the UE's temporary ID or authentication ID (e.g. TB_ui) may be replaced with a new random ID (e.g. TK_is) which is used to identify the UE 1201 at the slice-AAA/InfM-AAA 1203 or the slice provider or infrastructure controller, which may also be called infrastructure manager. The content of a signature of the Inf-AAA 1202 or the infrastructure provider may include some or all of information with regard to the infrastructure provider such as the infrastructure provider's ID or the infrastructure provider's public key, or hash of the infrastructure provider's ID. The signature of the Inf-AAA 1202 or the infrastructure provider may be signed using infrastructure provider's private key.

Upon receiving the initial registration request, the slice-AAA/InfM-AAA 1203 or the slice provider or infrastructure controller, at step 1218, sends the initial registration request to the service provider/server-AAA 1204 (or an application server). The slice-AAA/InfM-AAA 1203 or the slice provider or infrastructure controller may further add a random ID (e.g. TK_ss) into the received request. This random ID may be used to identify the UE 1201 at the service provider/server-AAA 1204.

At step 1220, the service provider/server-AAA 1204 (or an application server) generates a temporary UE ID or authentication UE ID (e.g. UE_server_TID). This temporary UE ID or authentication UE ID (e.g. UE_server_TID) may be used for the UE's identification in future communications with the service provider/server-AAA 1204 (or an application server). This temporary UE ID or authentication UE ID (e.g. UE_server_TID) may be encrypted using the AAA management function's 1205 public key.

Then, the service provider/server-AAA 1204 (or an application server) sends the initial registration response to the slice-AAA/InfM-AAA 1203 or the slice provider. The response may include one or more parameters such as the encrypted temporary UE ID or encrypted authentication UE ID (e.g. UE_server_TID), ID and signature of the service provider/server-AAA 1204 (or an application server), the random ID (e.g. TK_ss) in the received registration request. The content of the signature of the service provider/server-AAA 1204 (or an application server) may include some or all of information with regard to the service provider/server-AAA 1204 (or an application server) such as the service provider's ID or the service provider's public key, or hash of the service provider's ID. The signature of the service provider/server-AAA 1204 (or an application server) may be signed using the private key of the service provider/server-AAA 1204 (or an application server).

At step 1222, the slice-AAA/InfM-AAA 1203 or the slice provider or infrastructure controller generates a temporary UE ID or authentication UE ID (e.g. UE_slice/InfM_TID). This temporary UE ID or authentication UE ID (e.g. UE_slice/InfM_TID) may be used for the UE's 1201 identification in future communications with the slice-AAA/InfM-AAA 1203 or the slice provider or infrastructure controller. This temporary UE ID or authentication UE ID (e.g. UE_slice/InfM_TID) may be encrypted using the AAA management function's 1205 public key. Then, the slice-AAA/InfM-AAA 1203 or the slice provider or infrastructure manager generates its signature whose content may include one or more parameters related to information of the slice-AAA/InfM-AAA 1203 or the slice provider or infrastructure controller (e.g. slice-AAA/InfM-AAA 1203's ID, slice-AAA/InfM-AAA 1203's public key, hash value of the slice-AAA/InfM-AAA 1203). The content may be signed using the private key of the slice-AAA/InfM-AAA 1203 or the slice provider or infrastructure manager.

The slice-AAA/InfM-AAA 1203 or the slice provider or infrastructure manager may send a query request to the AAA management 1205. The query request may include one or more parameters such as the encrypted UE 1201's ID, a random ID (e.g. TK_sa) to identify UE 1201 in the AAA management function 1205, the UE 1201's signature, ID and signature of the Inf-AAA 1202 (or the infrastructure provider or mobility management function), ID and signature of the slice-AAA/InfM-AAA 1203, ID and signature of the service provider/server-AAA 1204 (or an application server), encrypted UE's 1201 service preference, encrypted temporary UE IDs or encrypted authentication UE IDs (e.g. encrypted UE_Inf_TID, encrypted UE_slice/InfM_TID, encrypted UE_server_TID).

At step 1224, the AAA management function 1205 verifies signatures of the UE 1201, the Inf-AAA 1202 (or the infrastructure provider or mobility management function), the slice-AAA/InfM-AAA 1203, the service provider/server-AAA 1204 (or an application server), using their public keys, respectively. The AAA management function 1205 then decrypts and obtains the UE's ID and creates or updates the temporary ID mapping information or authentication IDs mapping information (e.g. mapping table) for the UE 1201 (e.g. mapping the temporary ID or authentication IDs to the real UE ID of the UE 1201). Upon verifying the signatures, the AAA management function 1205 generates a subscription indicative of a list of allowed or authorized participators or roles and their public keys, a list of available participators and their public keys. For instance, when the UE 1201's signature is verified, the UE's 1201 subscription may include one or more parameters such as the UE's (temporary) ID mapping information (e.g. mapping table), the UE's temporary session key for secure communication with each role, a list of allowed infrastructures/infrastructure providers, slices/InfMs, servers/service providers and their public keys, and a list of available infrastructures/infrastructure providers, slices/InfMs, servers/service providers and their public keys. The UE's 1201 subscription may be encrypted using the corresponding public key (e.g. UE's public key), and may be signed using the AAA management function's 1205 private key.

At step 1226, the AAA management function 1205 sends a query response to the slice-AAA/InfM-AAA 1203. This query response may have one or more parameters such as the random ID (e.g. TK_sa) to identify UE 1201 in the AAA management function 1205, the signcrypted UE's 1201 subscription, the signcrypted Inf-AAA's 1202 (or the infrastructure provider's or mobility management function's) subscription, or the signcrypted slice-AAA/InfM-AAA's 1203 subscription, and the signcrypted service provider/server-AAA's 1204 (or an application server's) subscription. According to embodiments, if the signatures are not passed, the response may include the random ID (e.g. TK_sa).

The contents of subscriptions of the Inf-AAA 1202, the slice-AAA/InfM-AAA 1203 and the service provider/server-AAA 1204 are defined below. (It is noted that the content of the UE's subscription has been defined above.) The Inf-AAA's 1202 (or the infrastructure provider's or mobility management function's) subscription may include one or more parameters such as the UE's temporary ID or authentication ID for related communication, the UE's service preference, the UE's temporary session key for communication with the UE 1201, a list of allowed slices/InfMs, servers/service providers and their public keys, and a list of available slices/InfMs, servers/service providers and their public keys. The slice-AAA/InfM-AAA's 1203 subscription may include one or more parameters such as the UE's temporary ID or authentication ID for related communication, the UE's service preference, the UE's temporary session key for communication with the UE 1201, a list of allowed infrastructures/infrastructure providers, servers/service providers and their public keys, and a list of available infrastructures/infrastructure providers, servers/service providers and their public keys. The signcrypted service provider/server-AAA's (or an application server's) subscription may include one or more parameters such as the UE's temporary ID or authentication ID for related communication, the UE's service preference, the UE's temporary session key for communication with the UE 1201, a list of allowed infrastructures/infrastructure providers, slices/InfMs and their public keys, and a list of available infrastructures/infrastructure providers, slices/InfMs and their public keys.

At step 1228, the slice-AAA/InfM-AAA 1203 verifies and decrypts the query response (e.g. subscription cipher) received from the AAA management function 1205, and obtains the slice-AAA/InfM-AAA 1203's subscription contained in the query response (e.g. subscription cipher). The slice-AAA/InfM-AAA 1203 also generates its signature that is indicative of authorization to the UE 1201. The content of the slice-AAA/InfM-AAA's signature may include one or more parameters such as ID of the slice-AAA or InfM-AAA 1203, the random ID (e.g. TK_is) used to identify the UE 1201 and hash value of the random ID (e.g. hash value of TK_is). The signature can be signed using the slice-AAA/InfM-AAA's private key. In some embodiments, the signature may also be used to generate the UE's service subscription. The UE's service subscription may include one or more parameters such as agreement about allowed resource, agreed charging ways and the random ID (e.g. TK_is) used to identify the UE 1201. The UE's service subscription may be encrypted using the UE's temporary session key.

If the slice-AAA/InfM-AAA 1203's subscription includes an allowed server, the slice-AAA/InfM-AAA 1203, at step 1230, sends an authorization request to the allowed server. For instance, if the slice-AAA/InfM-AAA's subscription indicates that the service provider/server-AAA 1204 is allowed or authorized, then the slice-AAA/InfM-AAA 1203 sends an authorization request to the service provider/server-AAA 1204. The authorization request can be signed using the slice-AAA/InfM-AAA's private key. The authorization request may include one or more parameters such as the random ID (e.g. TK_ss) to identify the UE 1201 at the service provider/server-AAA 1204 and the signcrypted service provider/server-AAA's subscription.

At step 1232, the service provider/server-AAA 1204 verifies and decrypts the authorization request received from the slice-AAA/InfM-AAA 1203, and obtains the allowed slice-AAA/InfM-AAA's public key. The service provider/server-AAA 1204 can verify the signed authorization request using the allowed slice-AAA/InfM-AAA's public key. If the signed authorization request is verified, the service provider/server-AAA 1204 generates a signature that is indicative that authorization is granted to the UE 1201 by the service provider/server-AAA 1204. The content of the service provider/server-AAA's signature may include one or more parameters such as ID of the service provider/server-AAA 1204, the random ID (e.g. TK_ss) to identify the UE 1201 and hash value of the random ID (e.g. hash value of TK_ss). The signature can be signed using the service provider/server-AAA's private key. In some embodiments, the signature can also be used to generate the UE's service subscription. The UE's service subscription may include one or more parameters such as agreement about allowed resource, charging ways and the random ID (e.g. TK_ss) used to identify the UE 1201. The UE's service subscription may be encrypted using the UE's temporary session key.

At step 1234, the service provider/server-AAA 1204 sends an authorization response to the slice-AAA/InfM-AAA 1203. The authorization response can be signed using the service provider/server-AAA's private key. The authorization response may include one or more parameters such as the random ID (e.g. TK_ss) to identify the UE 1201 at the service provider/server-AAA 1204, a temporary UE ID or authentication ID (e.g. UE_server_TID) from the service provider/server-AAA 1204 and the service provider/server-AAA's signature for the UE 1201. In some embodiments, the authorization response may further include the UE's profile subscription. In cases where the slice-AAA/InfM-AAA 1203 is not legal (or not allowed), the authorization response may not include the service provider/server-AAA's signature for UE 1201 and the UE's profile subscription.

At step 1236, the slice-AAA/InfM-AAA 1203 receives the signed auth response and verifies the signed authorization response using the allowed server's public key (e.g. service provider/server-AAA 1204's public key). If the signed authorization response is verified, the slice-AAA/InfM-AAA 1203 accepts the server's signature (e.g. service provider/server-AAA 1204's signature) for the UE 1201 and the UE's profile subscription from the service provider/server-AAA 1204. Then, the slice-AAA/InfM-AAA 1203 sends a registration response to the Inf-AAA 1202 (or infrastructure provider or mobility management function in the infrastructure). The registration response is signed using the slice-AAA/InfM-AAA's private key. The registration response may include one or more parameters such as the random ID (e.g. TK_is) to identify the UE 1201 at the service provider/server-AAA 1204, the service provider/server-AAA's signature for UE 1201, the slice-AAA/InfM-AAA's signature for the UE 1201, the signcrypted UE's subscription, or the signcrypted Inf-AAA 1202's (or infrastructure provider's or mobility management function's) subscription, or the UE's service subscription from the service provider/server-AAA 1204 and the slice-AAA/InfM-AAA 1203. If the service provider/server-AAA 1204 is not verified or allowed through the authentication, the registration response will not include the service provider/server-AAA's signature for the UE 1201 and the UE's profile subscription.

At step 1238, the Inf-AAA 1202 (or infrastructure provider or mobility management function in the infrastructure) verifies and decrypts the signcrypted Inf-AAA's (or infrastructure provider's or mobility management function's) subscription contained in the registration response. Then, the Inf-AAA 1202 obtains the public key of the allowed slice provider or InfM (e.g. slice-AAA/InfM-AAA 1203). The Inf-AAA 1202 verifies the signed registration response using the public key of the allowed slice provider or InfM (e.g. slice-AAA/InfM-AAA 1203). If the slice-AAA/InfM-AAA 1203 is not verified or allowed through the authentication, the Inf-AAA 1202 (or infrastructure provider or mobility management function) rejects the registration response. If the slice-AAA/InfM-AAA 1203 is verified, the Inf-AAA 1202 stores temporary IDs or authentication IDs for the UE 1201 (e.g. UE_slice_TID, UE_InfM_TID, UE_Inf_TID). After the verification, the Inf-AAA 1202 (or infrastructure provider or mobility management function) may generate the UE's service subscription. The UE's service subscription may include one or more parameters such as such as agreement about allowed resource and agreed charging ways. The UE's service subscription may be encrypted by the UE's temporary session key.

At step 1240, the Inf-AAA 1202 (or infrastructure provider or mobility management function) forwards the signed registration response to the UE 1201. If the UE 1201 is not verified and authenticated, the response may include the UE's temporary ID or authentication ID obtained from AAA management function (e.g. TB_ui) and the indication of failed authentication for the UE 1201. On the other hand, if the UE 1201 is verified and authenticated, the response may include one or more parameters such as the UE's temporary ID or authentication ID obtained from AAA management function (e.g. TB_ui), signcrypted UE's subscription, encrypted UE's service subscription from the Inf-AAA 1202 (or infrastructure provider or mobility management function), the slice-AAA/InfM-AAA 1203 or the service provider/server-AAA 1204, the Inf-AAA's (or infrastructure provider's or mobility management function's) signature for the UE 1201, the slice-AAA/InfM-AAA's signature for the UE 1201, the service provider/server-AAA's signature for the UE 1201. The registration response can be signed using the Inf-AAA's (or infrastructure provider's or mobility management function's) private key.

If verification of all signatures are passed, the UE 1201, at step 1242, decrypts the signcrypted UE's subscription, and obtains the allowed Inf-AAA's (or infrastructure provider's or mobility management function's) public key. The UE 1201 also stores the UE's subscription, the slice-AAA/InfM-AAA 1203's signature, the service provider/server-AAA's signature, the UE's service subscription from the Inf-AAA 1202 (or infrastructure provider or mobility management function), the slice-AAA/InfM-AAA 1203, and/or the service provider/server-AAA 1204.

Figure 13:
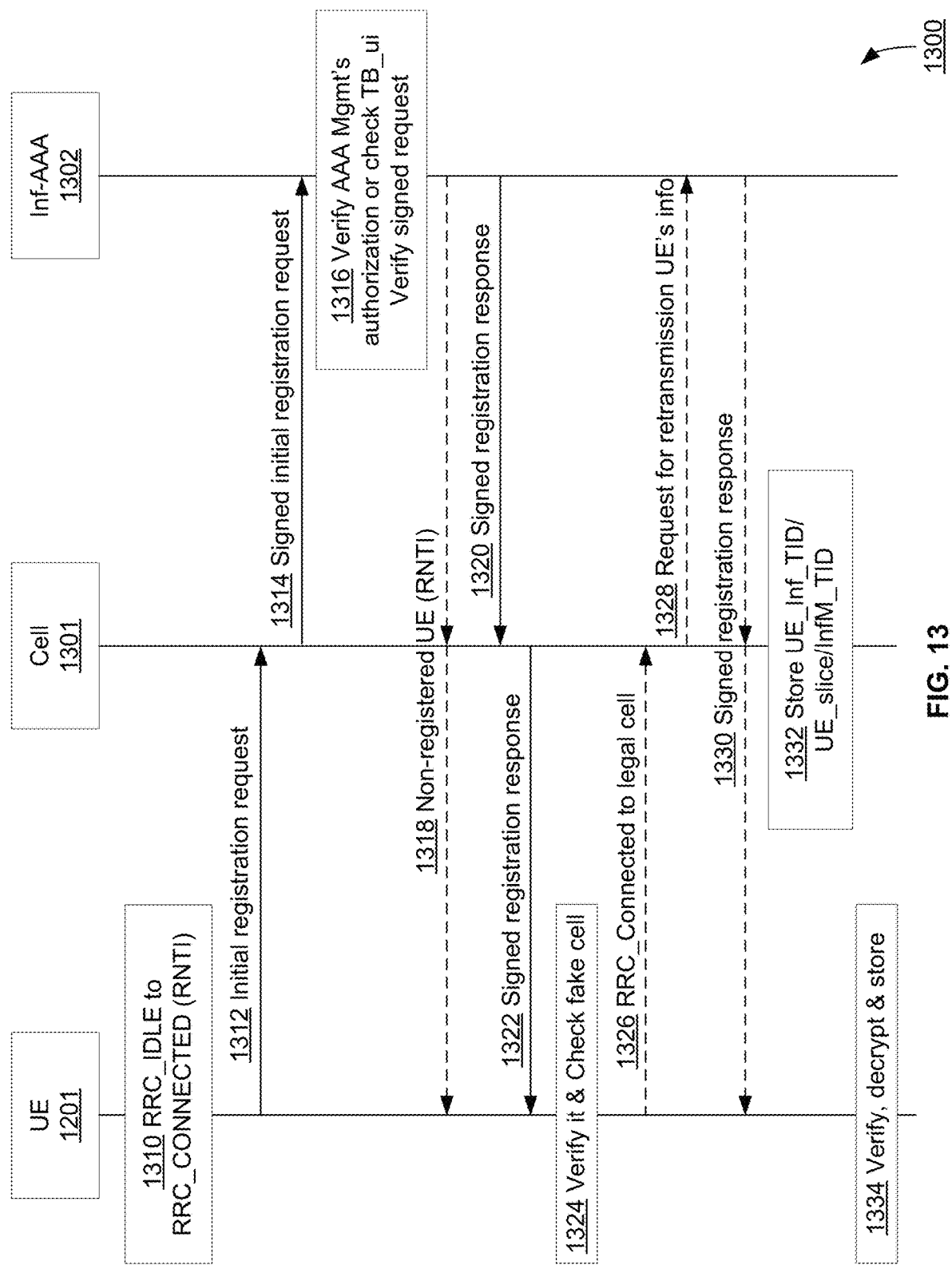
FIG. 13 illustrates a procedure for initial access authentication at a mobile UE, a cell and an InfAAA, in accordance with embodiments.

FIG. 13 illustrates a procedure 1300 for initial access authentication at a mobile UE, a cell and an infrastructure AAA, in accordance with embodiments of the present disclosure. In particular, the procedure 1300 illustrates steps 1210 to 1214 and steps 1240 to 1242 of the method 1200 in FIG. 12 with focus on the infrastructure AAA. The UE 1201 of FIG. 13 corresponds to the UE 1201 of FIG. 12, and the cell 1301 and the Inf-AAA 1302 correspond to the cell/Inf-AAA 1202 of FIG. 12.

At step 1310, before the UE 1201 connects to the network, RRC_connection is established or establishment of the RRC_connection is ensured. Then, the UE 1201, at step 1312, may send the initial registration request to the infrastructure 1302 directly or via the base station or cell 1301. This request may include one or more parameters such as the UE's 1201 temporary ID or authentication ID obtained from AAA management function (e.g. TB_ui), the UE's ID, the UE's signature and the UE's service preference. The UE's temporary ID or authentication ID may be encrypted using the current infrastructure's public key (e.g. Inf-AAA's 1302 public key), and the UE's real ID and the UE's service preference may be encrypted using AAA management function's public key. In some embodiments, the initial registration request may further include the AAA management function's signature indicative of authorization to the UE 1201. The initial registration request may be signed using the UE's private key. The content of the UE's signature may include the UE's information (e.g. UE real ID, UE's public key, or hash value of UE real ID).

If the initial registration request is transmitted through the cell 1301, the initial registration request further includes a random ID (e.g. RNTI) which may be assigned by cell 1301 to identify the UE 1201 during the RRC_connection procedure. The cell/base station 1301, at step 1314, generates a random ID (e.g. RNTI) to identify the UE 1201 in the current session. In some embodiments, the random ID (e.g. RNTI) may be replaced with the cell's ID or other random ID (e.g. random ID1) in the initial registration request. Further at step 1314, the initial registration request may be signed using the private key of the cell 1301. Then, the cell/base station 1301 forwards the signed registration request to the infrastructure provider or Inf-AAA 1302. It may be noted that steps 1310 to 1314 correspond to the step 1210 of the method 1200 in FIG. 12.

At step 1316, the Inf-AAA 1302 (or infrastructure provider or mobility management function) receives the initial registration request message from the cell 1301. Upon receipt of the initial registration request message, the Inf-AAA 1302 may verify whether the UE 1201 is valid and is not a threat actor (e.g. fake UE). For instance, the Inf-AAA 1302 may check the UE's temporary ID or authentication ID (e.g. TB_ui), in case that the UE's temporary ID or authentication ID is kept in the infrastructure. In some embodiments, the Inf-AAA 1302, upon receipt of the initial registration request message, may verify the AAA management function's (e.g. AAA management function 1205 in FIG. 12) signature by decrypting the hash value of the UE's temporary ID or authentication ID (e.g. TB_ui) using AAA management function's public key. In some embodiments, the Inf-AAA 1302, upon receipt of the signed initial registration request message, may verify the signed initial registration required using the cell's public key. It may be noted that step 1316 corresponds to the step 1212 of the method 1200 in FIG. 12.

If the validity of the UE 1201 is successfully verified at step 1316, the UE 1201 is already registered. In such case, step 1318 does not need to be performed. If the UE 1201 is not verified, the Inf-AAA 1302 (or infrastructure provider or mobility management function), at step 1318, sends the UE 1201 a message indicative that the UE 1201 is not registered. It may be noted that step 1318 corresponds to the step 1214 of the method 1200 in FIG. 12.

At step 1320, the Inf-AAA 1302 (or infrastructure provider or mobility management function) forwards the signed registration response to the UE 1201. The Inf-AAA 1302 (or infrastructure provider or mobility management function) generates a signature for authorization to the cells 1301. The signature may be signed using the private key of the Inf-AAA 1302 (or infrastructure provider or mobility management function). The content of the signature may include one or more parameters such as valid (legal) cell ID, the UE's temporary ID or authentication ID (e.g. TB_ui) or other information related to the UE 1201.

The registration response may include one or more parameters such as the UE's temporary ID or authentication ID obtained from AAA management (e.g. TB_ui), signcrypted UE's subscription, encrypted UE's service subscription from the Inf-AAA 1302 (or infrastructure provider or mobility management function), the slice-AAA/InfM-AAA or the service provider/server-AAA, the Inf-AAA's (or infrastructure provider's or mobility management function's) signature for the UE 1201, the slice-AAA/InfM-AAA's signature for the UE 1201, the service provider/server-AAA's signature for the UE 1201. The registration response can be signed using the Inf-AAA's (or infrastructure provider's or mobility management function's) private key. The registration response may further include infrastructure provider ID, a random ID (e.g. random ID1), a list of signatures for authorization to the cells 1301 and a list of corresponding legal cell IDs encrypted using a temporary session key. The registration response may further include UE's temporary ID or authentication ID (e.g. UE_Inf_TID or UE_slice/InfM_TID) if the cell 1301 is valid (e.g. legal). The UE's temporary ID or authentication ID may be encrypted using the cell's public key. The registration response is sent to the cell 1301.

Upon receipt of the registration response, if the cell 1301 is valid (e.g. legal), the cell 1301, at step 1322, verifies the registration response message using the Inf-AAA's (or infrastructure provider's or mobility management function's) private key. Upon the verification, the cell 1301 decrypts the registration response message and obtains the UE's temporary ID or authentication ID. Then, the cell 1301 sends the registration response to the UE 1201.

If the registration response is signed by the Inf-AAA 1302 (or infrastructure provider or mobility management function), the UE 1201, at step 1324, may verify the registration response, the signature for authorization to the cell 1301, or both. In other words, the UE 1201 can detect fake cells if a cell broadcast message (e.g. System Information Broadcast (SIB) message) is signed with the Inf-AAA's (or infrastructure provider's or mobility management function's) private key, as is illustrated above at step 1322. The UE 1201 may verify the registration response, the signature for authorization to the cell 1301, or both, using the Inf-AAA's (or infrastructure provider's or mobility management function's) public key. It may be noted that the UE 1201 can detect fake cells before RRC_connection being established. For that, a list of signatures for authorization to the cell 1301 may be included in the cell broadcast message or the registration response.

If the cell 1301 is valid (legal), the UE 1201, at step 1326, may establish a new RRC_connection with the legal cell 1301. Upon establishing the new RRC_connection, the cell 1301, at step 1328, may send, to the Inf-AAA 1302 (or infrastructure provider or mobility management function), a request for retransmission of the UE's information. The UE's information may include the UE's subscription, the UE's service subscription, and signatures indicative of authorization to the UE 1201.

At step 1330, the Inf-AAA 1302 (or infrastructure provider or mobility management function) retransmits the UE's information to the UE 1201 through the cell 1301. The retransmitted information may include the UE's subscription, the UE's service subscription, and signatures indicative of authorization to the UE 1201. The Inf-AAA 1302 (or infrastructure provider or mobility management function) can also notify the new legal cell 1301 of the UE's temporary IDs or authentication IDs (e.g. UE_Inf_TID, UE_slice/InfM_TID). When received, the cell 1301, at step 1332, stores the UE's temporary IDs or authentication IDs (e.g. UE_Inf_TID, UE_slice/InfM_TID).

It may be noted that steps 1320 to 1332 correspond to the step 1240 of the method 1200 in FIG. 12.

If verification of the signatures are confirmed, the UE 1201, at step 1334, decrypts the signcrypted UE's subscription, and obtains the allowed Inf-AAA's (or infrastructure provider's or mobility management function's) public key. The UE 1201 also stores the UE's subscription, the slice-AAA/InfM-AAA's signature, the service provider/server-AAA's signature, the UE's service subscription from the Inf-AAA 1202 (or infrastructure provider or mobility management function), the slice-AAA/InfM-AAA 1203, and/or the service provider/server-AAA 1204. It may be noted that step 1334 corresponds to the step 1242 of the method 1200 in FIG. 12.

Figure 14:
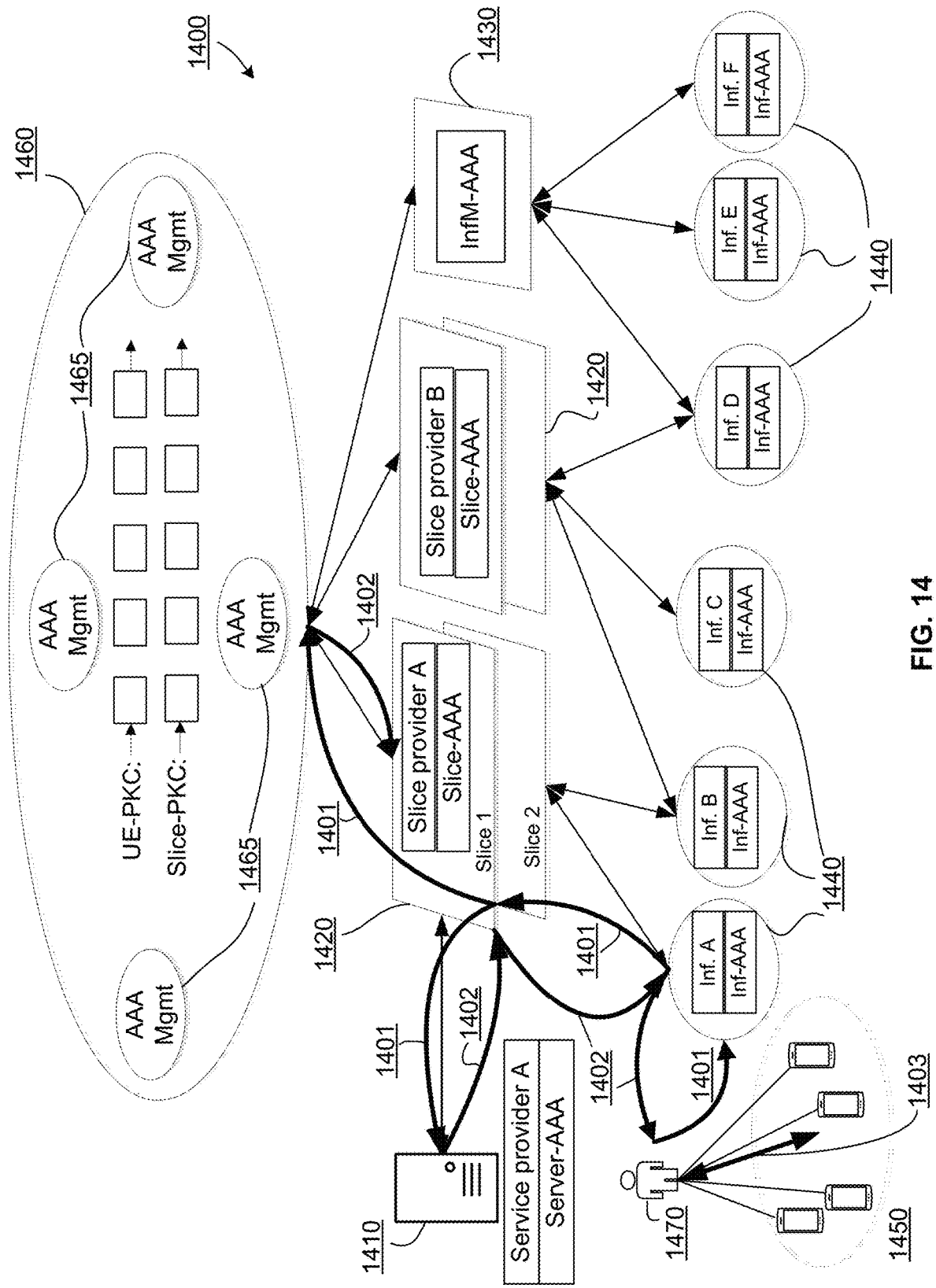
FIG. 14 illustrates a method of device access authentication via a customer, in accordance with embodiments.

In a network system, there are services, for example vertical services, provided through machine to machine (M2M) devices. Such vertical services may include industrial instrumentation and enablement of sensors or meters to communicate the information (e.g. temperature, etc.) collected or recorded by devices. The devices providing such services may have similar features and may be used and shared by people in the same company or same industry (e.g. meter reading company). In such cases, the customer and the owner of the devices may first perform the registration and authentication procedure for the devices, as is illustrated in FIG. 14. FIG. 14 illustrates a method of device access authentication via a customer, in accordance with embodiments of the present disclosure. The unified authentication architecture 1400 is similar to the unified authentication architecture 1100 illustrated in FIG. 11.

According to embodiments, each of devices 1450 is individually authenticated and authorized by the customer or the owner of devices. In other words, the customer 1470 carries out the registration procedure at the network on behalf of the device 1450. The customer 1470 sends an initial registration request to the AAA management function 1465 in the distributed trust third party 1460 (e.g. formed using blockchain) for requesting for authentication and authorization. The initial registration request may be transmitted to the AAA management function 1465 via one or more of the service provider 1410, the slice provider 1420, the infrastructure manager (InfM) 1430 and the infrastructure provider 1440, as is illustrated by the transmission flow 1401. The initial registration request may proceed through similar steps of the initial access authentication method 1200 in FIG. 12. After the customer 1470 is verified and authenticated by the AAA management function 1465, the customer's subscription (e.g. agreement about allowed resource, agreed charging ways, other relevant information and other agreements) and the customer's temporary IDs (or authentication IDs) are sent back the customer 1470, as is illustrated by the transmission flow 1402. The customer 1470 may further obtain information such as a list of allowed infrastructure/infrastructure providers, slices/InfMs and their public keys, and a list of available infrastructure/infrastructure providers, slices/InfMs and their public keys. Then, one or more of the customer's subscription, the customer's temporary IDs (or authentication IDs) and information from the AAA management function 1465 may be transmitted to the device 1450, as is illustrated by the transmission flow 1403.

The device 1450 may be registered to the customer 1470. In some embodiments, the device 1450 may be registered to the customer 1470 offline. In some embodiments, the device 1450 may be registered to the customer 1470 before initial registration request is transmitted to the AAA management function 1465. According to embodiments, various information may be embedded into the device 1450, for example the customer's subscription, customer's temporary IDs (or authentication IDs), customer's public key, and device's public/private key.

In networking systems, when a UE moves out of the registration area of the home operator, the home operator needs to be involved for network access authentication and service access authentication. The involvement of the home operator may trigger extra message exchanges, in particular for high-mobility scenarios. However, in various embodiments of the present disclosure, the extra message exchanges may not be needed. According to embodiments, temporary UE IDs or authentication UE IDs may be updated due to security requirements and mobility requirements. According to embodiments, when a participator or entity or function already has authenticated a UE, the UE does not need to be (further) authenticated by the AAA management function, thereby reducing the extra overhead caused by additional message exchanges from the home operator.

Figure 15:
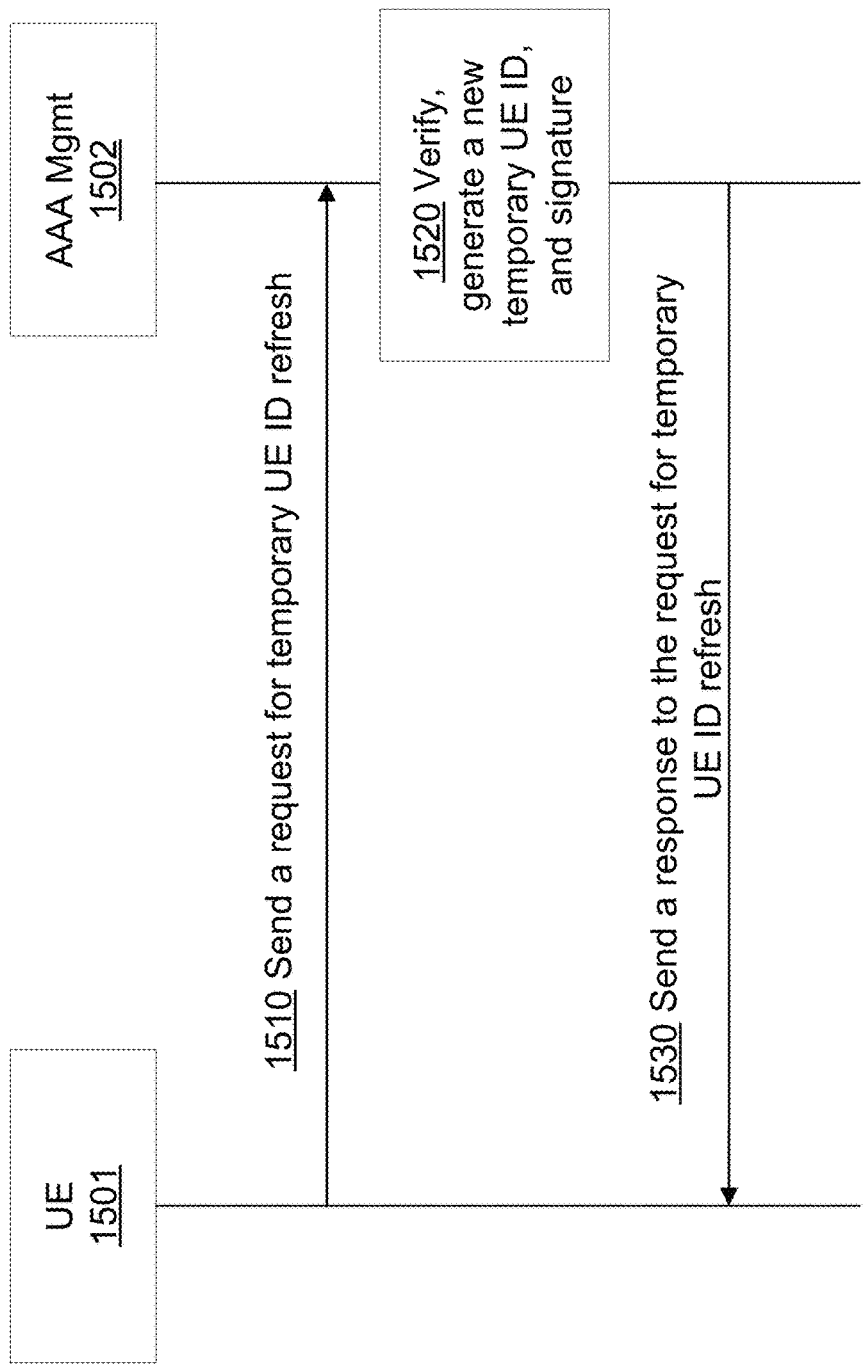
FIG. 15 illustrates a method of triggering an update of a UE's temporary UE ID or authentication UE ID, in accordance with embodiments.

According to embodiments, UE's temporary ID or authentication ID may need to be refreshed or update, due to security requirements or mobility requirements. The update of the UE's temporary ID or authentication ID may be triggered by UE or network. In such cases, the UE may directly or indirectly send a temporary UE ID or authentication UE ID update request to the distributed trust third party (e.g. configured using blockchain) for one or more new parameters such as new TB_ui and new AAA management function's signature indicative of authorization to the UE. FIG. 15 illustrates a method 1500 of triggering an update of the UE's temporary ID or authentication ID, in accordance with embodiments of the present disclosure.

Referring to FIG. 15, the UE 1501, at step 1510, sends a request for temporary UE ID or authentication UE ID refresh to the AAA management function 1502. The temporary UE ID or authentication UE ID refresh request may include one or more parameters such as the UE's ID, the signature indicative of authorization to the UE 1501, the encrypted UE's temporary ID or authentication ID and the UE's service preference. The request may be encrypted using the AAA management function's 1502 public key and signed using the UE's private key.

At step 1520, the AAA management function 1502 verifies the received request using the UE's public key and decrypts the received request. The AAA management function 1502 obtains the UE's ID from the decrypted request. Then, the AAA management function 1502 generates a new temporary UE ID or authentication UE ID of the UE 1501 (e.g. new TB_ui) and a new signature indicative of authorization to the UE 1501. The content of the signature may include one or more parameters such as a new temporary UE ID or authentication UE ID of the UE 1501 (e.g. new TB_ui).

The AAA management function 1502, at step 1530, sends a response for the temporary UE ID refresh request to the UE 1501. This response may include one or more parameters such as a new temporary UE ID or authentication UE ID of the UE 1501 (e.g. new TB_ui) and the AAA management function's 1502 signature indicative of authorization to the UE 1501. The response may be encrypted using the UE's public key and signed using the AAA management function's 1502 private key.

According to embodiments, the temporary UE ID update may be triggered by the network entities due to security requirements or mobility requirements. For instance, Inf-AAA may generate a new temporary UE ID or new authentication UE ID and notify related entities (e.g. UE, slice-AAA, Inf-AAA) of the temporary UE ID or authentication UE ID update. Upon notification, the related network entities (e.g. Slice-AAA or Inf-AAA) may update their relationships with the UE using the UE's new temporary ID or authentication UE ID, and notify the relationship update to the AAA management function. The AAA management function can be notified of the relationship update via offline, online or combination of both.

If UE moves to an area covered by a network entity (e.g. infrastructure provider, slice) that is different from the network entity to which the UE currently has access, the new network entity can generate a new temporary ID or authentication ID for the UE and notify related network entities (e.g. UE, slice-AAA, Inf-AAA). Then, the related network entities (e.g. Slice-AAA or Inf-AAA) may update their relationship to the UE using the UE's new temporary ID or the UE's new authentication ID, and notify the relationship update to the AAA management function via offline, online or combination of both.

Figure 16:
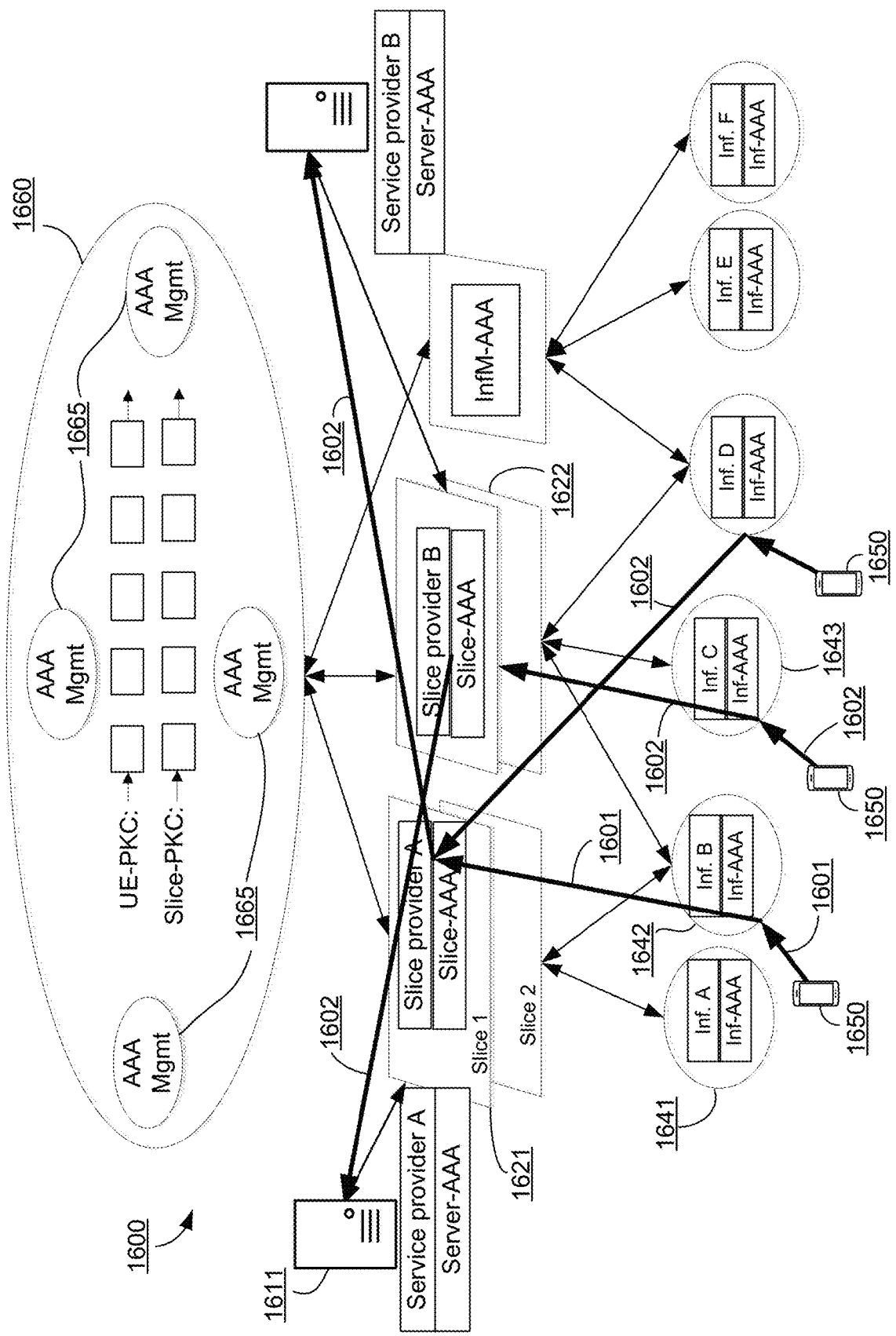
FIG. 16 illustrates an example of a temporary UE ID or authentication UE ID update triggered by a network entity, in accordance with embodiments.

FIG. 16 illustrates an example of the temporary UE ID or authentication UE ID update triggered by a network entity, in accordance with embodiments of the present disclosure. Referring to FIG. 16, the unified authentication architecture 1600 is similar to the unified authentication architecture 1400 illustrated in FIG. 14. The UE 1650, which initially has access to network entities (server 1611, slice provider 1621 and infrastructure provider 1641), moves to an area covered by the infrastructure provider 1642. Upon the move, the UE 1650 sends a request for updating its temporary UE ID or authentication UE ID. The request may include one or more parameters such as ID(s) of network entities receiving the request (request entities), signatures indicative of authentication to the UE 1650, encrypted current temporary UE ID or encrypted current authentication UE ID, the UE's service preference and the UE's profile preference. The UE 1650 may be verified through the slice provider's signature. The verification may fail if the UE 1650 is a non-registered UE. Once the UE 1650 is verified, the infrastructure provider 1642 generates the UE's new temporary ID or the UE's new authentication ID (e.g. UE_Inf_TID) and notifies the slice provider 1621 and the server 1611. The slice provider 1621 may send the updated UE ID information, for example a mapping table, to the AAA management function 1665 in the distributed trust third party 1660 (e.g. configured using a blockchain) via offline, online or combination of both.

Similarly, if the UE 1650 again moves to an area covered by the infrastructure 1643 and the slice provider 1622, the UE 1650 may be verified using the server's signature upon the UE's temporary ID update request. After the UE 1650 is verified, the infrastructure 1643 and the slice provider 1622 generate the UE's new temporary IDs or authentication IDs (e.g. UE_Inf_TID, UE_slice_TID). This will be notified to the server 1611. The slice provider 1622 may send the updated UE ID information, for example a mapping table, to the AAA management function 1665 in the distributed trust third party 1660 via offline, online or combination of both.

According to embodiments, there are envisioned to be three classified types of request entities for UE mobility access authentication—(i) type I-request entity (x, A, A), (2) type II-request entity (x, x, A)/(A, x, A)/(A, x, x)/(A, A, x)/(x, A, x) and (3) type III-request entity (x, x, x). In the unified authentication architecture 1600 illustrated in FIG. 16, the type I-request entity (x, A, A) may be denoted by the arrows 1601 and the type II-request entity (x, x, A)/(A, x, A)/(A, x, x)/(A, A, x)/(x, A, x) may be denoted by the arrows 1602. It may be noted that the format of request entity is (infrastructure ID, slice ID or InfM ID, service ID). It may be further noted that "x" refers to any entity ID, and "A" refers to entity A which already provides authorization to UE.

In various embodiments, the type I-request entity and the type II-request entity may not need AAA management function authentication, but the type III-request entity may require AAA management function authentication. For example, further referring to FIG. 16, the UE 1650 requests initial access authentication which includes request entity (A, A, A); then the UE 1650 requests for mobility access authentication which may include request entity (B, A, A), or (C, B, A), or others. If the UE 1650 asks for request entity (A, A, A), it means that the UE 1650 does not move out of the registration area of entity. On the other hand, if the UE 1650 asks for request entity (x, x, x) (i.e. type III—request entity), it means that the UE 1650 may need to run the initial access authentication, as is illustrated elsewhere herein.

Figure 17:
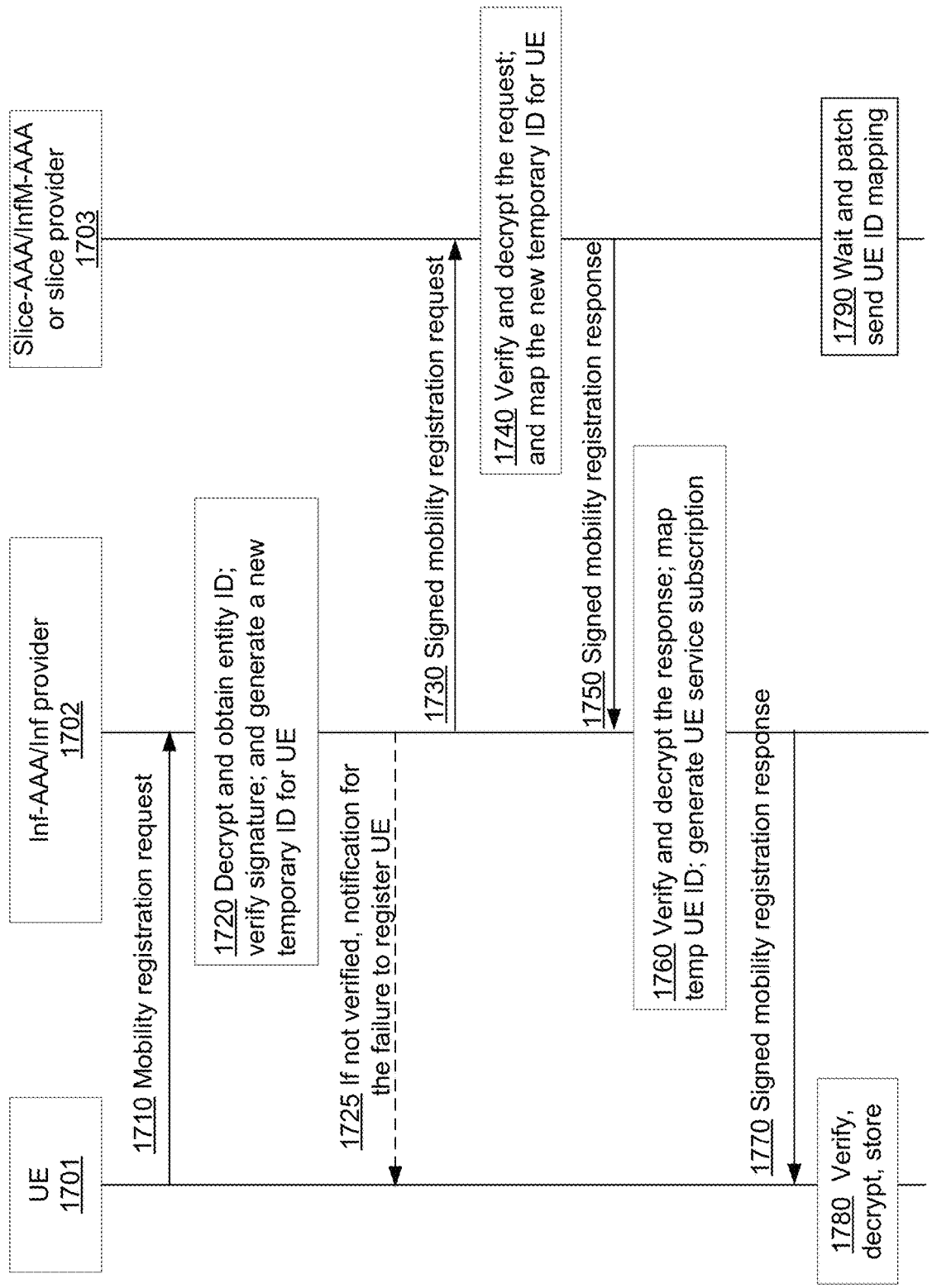
FIG. 17 illustrates a method of a temporary UE ID or authentication UE ID update triggered by the type I-request entities, in accordance with embodiments.

FIG. 17 illustrates a method of the temporary UE ID or authentication UE ID update triggered by the type I-Request entities (x,A,A), in accordance with embodiments of the present disclosure. According to embodiments, when the type I-Request entities (x,A,A) trigger update of the temporary UE ID, the UE moves only within the same registration area covered by the slice provider or infrastructure manager (InfM), and requests the same service. When the UE is authenticated and verified, the infrastructure provider or Inf-AAA can generate the UE's temporary ID or authentication ID (e.g. UE_Inf_TID) and a signature indicative of authorization to the UE.

Referring to FIG. 17, the UE 1701, at step 1710, sends a mobility registration request to the Inf-AAA or infrastructure provider 1702. The mobility registration request may include one or more parameters such as a random ID, ID of the request entity (x, A, A) encrypted using current infrastructure (x)'s public key, the old temporary ID or authentication ID (e.g. UE_slice/InfM_TID) encrypted using old slice (A)/InfM(A)'s public key, the old slice (A)'s/InfM (A)'s signature indicative of authorization to the UE 1701, the random ID (e.g. TK_is) encrypted using current infrastructure (x)'s public key, the UE's service preference encrypted using old slice (A)/InfM(A)'s public key.

Upon receipt of the mobility registration request, the Inf-AAA or infrastructure provider 1702, at step 1720, decrypts the request, and obtains one or more parameters contained in the request. For instance, the Inf-AAA or infrastructure provider 1702 obtains ID of the request entity (x, A, A) encrypted using current infrastructure (x)'s public key and the random ID (e.g. TK_is) encrypted using current infrastructure (x)'s public key. If the Inf-AAA or infrastructure provider 1702 has the requested the slice-AAA/InfM-AAA/slice provider's public key, the slice-AAA/InfM-AAA/slice provider's signature for the UE 1701 can be verified at this step. The Inf-AAA or infrastructure provider 1702 generates a new temporary ID or authentication ID for the UE 1701 (e.g. UE_Inf_TID) used to identify the UE 1701 in the future communications. If the slice's signature or the InfM's signature for the UE 1701 is not verified (i.e. verification failed), the Inf-AAA or infrastructure provider 1702, at step 1725, notifies the UE 1701 that the UE 1701 is not registered to the network. A random ID may be transmitted to the UE 1701 in this registration failure notification.

The Inf-AAA or infrastructure provider 1702, at step 1730, sends the mobility registration request to the slice-AAA/InfM-AAA or slice provider 1703. The mobility registration request may include one or more parameters such as infrastructure ID (Inf ID), the new temporary ID or authentication ID for the UE 1701 (e.g. UE_Inf_TID) encrypted using old slice (A)'s/InfM(A)'s public key, the new random ID (e.g. TK_is) to identify the UE 1701 in the session communication, the request entity encrypted using the slice-AAA/InfM-AAA's public key, other temporary ID or authentication ID for the UE 1701 (e.g. UE_slice/InfM_TID) and the UE's service preference. The other encrypted temporary ID for the UE 1701 (e.g. UE_slice/InfM_TID) and the UE's service preference may be also encrypted. The mobility registration request is signed using the infrastructure's private key.

The slice-AAA/InfM-AAA or slice provider 1703, at step 1740, verifies the (signed) mobility registration request and decrypts the request. When the request is verified and decrypted, the slice-AAA/InfM-AAA or slice provider 1703 locally checks the (e.g. other) temporary IDs or authentication IDs for the UE 1701 (e.g. UE_slice_TID or UE_InfM_ID). If the verification is successfully completed, the slice-AAA/InfM-AAA or slice provider 1703 establishes or maintains the mapping for the received temporary UE IDs or authentication IDs (e.g. mapping between UE_slice/InfM_TID and UE_Inf_TID).

The slice-AAA/InfM-AAA or slice provider 1703, at step 1750, sends a mobility registration response to the Inf-AAA or infrastructure provider 1702. The mobility registration response may include the result of verification and one or more parameters such as the new random ID (e.g. TK_is) to identify the UE 1701 in the session communication, the (other) temporary ID or authentication ID for the UE 1701 (e.g. UE_slice/InfM_TID) encrypted using the current infrastructure (x)'s public key, the UE's service preference encrypted using the infrastructure (x)'s public key. The mobility registration response may be signed using the private key of the old slice (A)/InfM (A).

At step 1760, the Inf-AAA or infrastructure provider 1702 receives and verifies the mobility registration response. If successfully verified, the Inf-AAA or infrastructure provider 1702 generates the UE 1701's service subscription. The Inf-AAA or infrastructure provider 1702 may establish or maintain the mapping for the temporary UE ID or authentication UE ID (e.g. UE_Inf_TID).

At step 1770, the Inf-AAA or infrastructure provider 1702 sends the mobility registration response to the UE 1701. The mobility registration response may be signed using infrastructure (x)'s private key. The mobility registration response may include one or more parameters such as the random ID, infrastructure ID, infrastructure's signature for the UE 1701, the UE's service subscription encrypted using a session key. The UE's service subscription may include the temporary UE ID or authentication UE ID associated with the infrastructure or the Inf-AAA or infrastructure provider 1702 (e.g. UE_Inf_TID).

The UE 1701, at step 1780, verifies the signed mobility registration response using the infrastructure's public key and decrypts and stores the UE's service subscription and the infrastructure's signature for the UE 1701. After collecting some mapping information for the new temporary UE IDs or authentication UE IDs, for example mapping table(s), the Slice-AAA/InfM-AAA or slice provider 1703, at step 1790, sends the mapping information (e.g. mapping table(s)) to the AAA management function via offline, online or combination of both.

Figure 18:
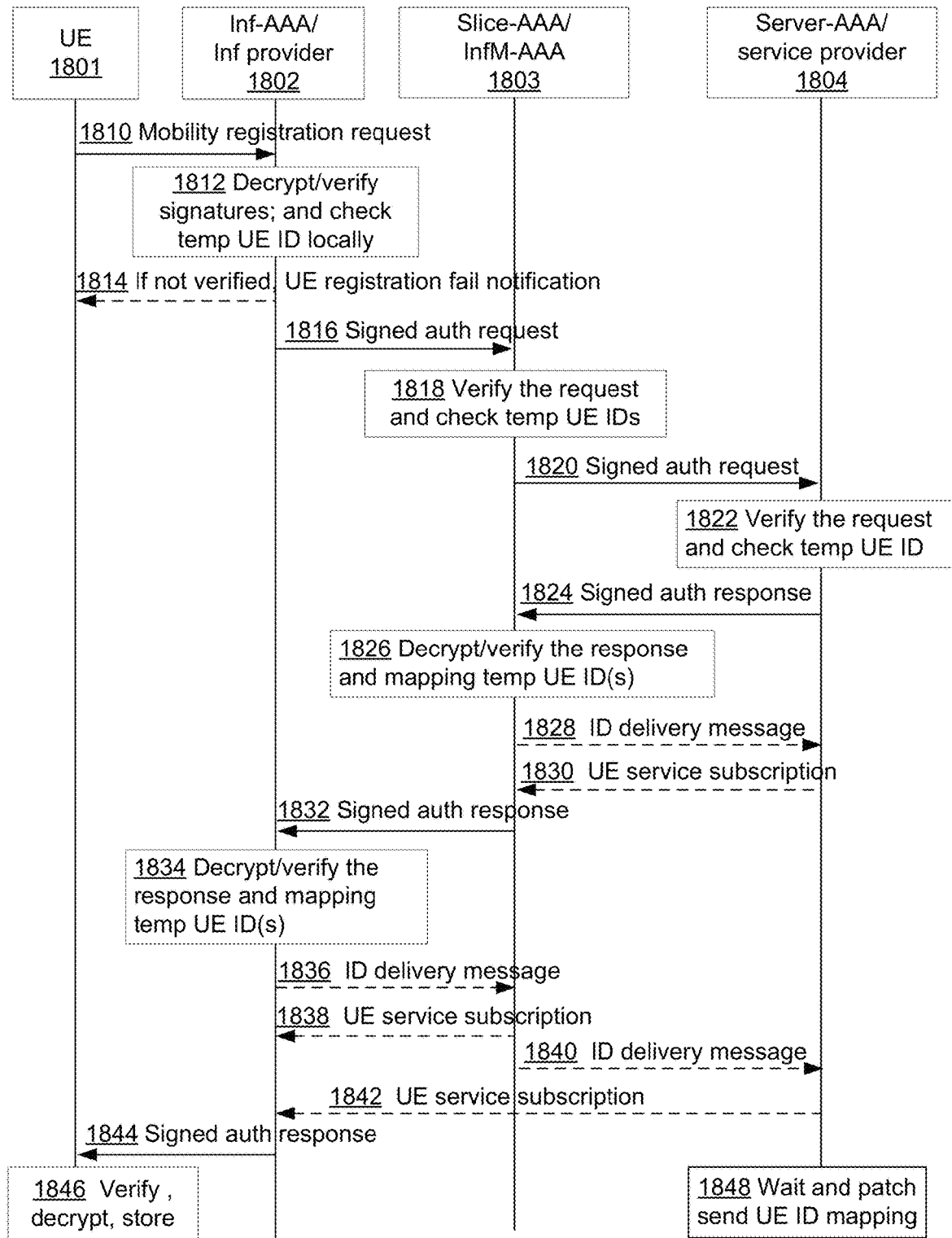
FIG. 18 illustrates a method of a temporary UE ID or authentication UE ID update triggered by the type II-request entities, in accordance with embodiments.

FIG. 18 illustrates a method of the temporary UE ID or authentication UE ID update triggered by the type II-Request entities (x, x, A)/(A,x,A)/(A, x, x)/(A, A, x)/(x, A, x), in accordance with embodiments of the present disclosure. According to embodiments, when the type II-Request entities (x, x, A)/(A,x,A)/(A, x, x)/(A, A, x)/(x, A, x) trigger update of the temporary UE ID or authentication UE ID, UE requests the same service during the UE's movement period. While the UE can stay or move out the current registration area of the infrastructure A, the UE requests different slice provider or infrastructure manager (InfM). For type II-Request entities, upon authentication of the UE, slice-AAA/InfM-AAA generates the UE's temporary ID or authentication ID (e.g. UE_slice_TID, UE_InfM_TID or UE_Inf_TID) and a signature indicative of authorization to the UE. The infrastructure provider or Inf-AAA may also generate the signature indicative of authorization to the UE when it does not have its own temporary UE ID or its own authentication UE ID.

Referring to FIG. 18, the UE 1801, at step 1810, sends a mobility registration request to the Inf-AAA or infrastructure provider 1802 or mobility management function. The mobility request may include one or more parameters such as ID of the request entity (x,x,A/A,x,A/A,x,x/x,A,x/A,A,x), the UE's temporary ID or authentication ID, previous slice (A)/InfM (A)'s authorization signature for the UE 1801 with a random ID (e.g. TK_is), previous server (A)'s authorization signature for the UE 1801 with a random ID (e.g. TK_ss), the UE's service preference, a random ID for access to the Inf_AAA/infrastructure provider 1802 (or new infrastructure). The mobility request may include a temporary ID or authentication ID of the UE 1801 (e.g. TB_ui) that is encrypted using old infrastructure (A)'s public key and its corresponding signature from the old infrastructure (A), if access to the old infrastructure (A) is required.

Regarding the one or more parameters of the mobility request, in various embodiments, the ID of the request entity (x,x,A/A,x,A/A,x,x/x,A,x/A,A,x) may be encrypted using current infrastructure's public key (e.g. Inf-AAA or infrastructure provider 1802's public key). The encrypted UE's temporary ID or authentication ID may be encrypted using the previous entity's public key. The encrypted UE's temporary ID or authentication ID may include UE_slice/InfM_TID encrypted using previous slice (A)/InfM(A)'s public key for access to old slice (A)/InfM (A), UE_server_TID encrypted using old server (A)'s public key for access to old server (A), and/or UE_Inf_TID encrypted using old infrastructure (A)'s public key for access to old infrastructure (A). The previous slice (A)/InfM (A)'s authorization signature for the UE 1801 with a random ID (e.g. TK_is) may be encrypted using the current infrastructure provider's public key (e.g. Inf-AAA or infrastructure provider's public key), and the previous server (A)'s authorization signature for the UE 1801 with a random ID (e.g TK_ss) may be encrypted using the current infrastructure provider's public key (e.g. Inf-AAA or infrastructure provider's public key). The UE's service preference may be encrypted using previous slice (A)/InfM(A)'s public key, old server (A)'s public key and/or previous infrastructure (A)'s public key.

Upon receiving the mobility request, the Inf-AAA or infrastructure provider 1802, at step 1812, may verify the server-AAA/service provider's authorization signature using the server-AAA/service provider's public key. Also, the Inf-AAA or infrastructure provider 1802 may verify the slice-AAA/InfM-AAA's authorization signature using the slice-AAA/InfM-AAA's public key. If the verification fails, step 1814 may be performed. At step 1814, the Inf-AAA or infrastructure provider 1802 sends a message indicating that UE is not registered to network. This message may include a random ID (e.g. TK_is). If the verification succeeds, the Inf-AAA or infrastructure provider 1802 decrypts the received mobility request and checks the UE's temporary ID or authentication ID (e.g. UE_Inf_TID) locally. If the UE's temporary ID or authentication ID (e.g. UE_Inf_TID) is not available, a new temporary ID or authentication ID for the UE 1801 (e.g. UE_Inf_TID) will be generated and step 1816 may be performed.

The Inf-AAA or infrastructure provider 1802, at step 1816, sends an authorization request to the slice-AAA/InfM-AAA 1803. The authorization request may include the Inf-AAA or infrastructure provider's ID (Inf ID) and may be signed using the Inf-AAA/infrastructure provider's private key. The authorization request may include one or more parameters such as the request entity encrypted using the current slice's/InfM's public key (e.g. slice-AAA/InfM-AAA's public key), a new random ID (e.g. new TK_is) if any of communication entity is new, the UE's service preference, and the UE's temporary IDs or authentication ID (e.g. UE_Inf_TID). In various embodiments, the UE's service preference encrypted and the UE's temporary IDs or authentication ID (e.g. UE_Inf_TID) may be encrypted using previous slice(A)'s public key, InfM(A)'s public key or previous server (A)'s public key.

Upon receiving the auth request, the slice-AAA/InfM-AAA 1803, at step 1818, verifies the received authorization request. The received authorization request may be signed using the Inf-AAA/infrastructure provider's private key. The slice-AAA/InfM-AAA 1803 may decrypt the received auth request and check the UE's temporary ID or authentication ID (e.g. UE_slice/InfM_TID) locally. If the UE's temporary ID or authentication ID (e.g. UE_slice/InfM_TID) is not available, the slice-AAA/InfM-AAA 1803 may generate a new temporary ID or authentication ID for the UE 1801 (e.g. UE_slice/InfM_TID) and the signature indicative of authorization to UE 1801.

The Slice-AAA/InfM-AAA 1803, at step 1820, sends the auth request to the server-AAA/service provider 1804. The authorization request may be signed using the slice-AAA/InfM-AAA's private key and may include one or more parameters such as slice ID or InfM ID, Inf ID, a new random ID to identify the UE 1801 (e.g. new TK_ss) if any of communication entity is new, the ID of request entity, the UE's temporary IDs or authentication IDs (e.g. UE_slice/InfM_TID D) and the UE's service preference. In various embodiments, one or more of the temporary IDs or authentication IDs for the UE 1801 (e.g. UE_slice/InfM_TID D) may be encrypted using previous server (A)'s public key. One or more of the ID of request entity, the UE's temporary ID or authentication ID and the UE 1801's service preference may be also encrypted.

Upon receiving the auth request, the server-AAA/service provider 1804, at step 1822, verifies and decrypts the received auth request. Then, the server-AAA/service provider 1804 checks the UE's temporary ID or authentication ID (e.g. UE_server_TID) locally. If the UE's temporary ID or authentication ID (e.g. UE_server_TID) is not available, the server-AAA/service provider 1804 may generate a new temporary ID or authentication ID for the UE 1801 (e.g. UE_server_TID) and the signature indicative of authorization to UE 1801.

The server-AAA/service provider 1804, at step 1824, sends an authorization response to the slice-AAA/InfM-AAA 1803. The authorization response may be signed using the server-AAA/service provider's private key. The authorization response may include one or more parameters such as the server-AAA/service provider's ID, new random ID to identify the UE 1801 (e.g. new TK_ss), the UE's service subscription, the UE's temporary ID or authentication ID (e.g. UE_server_TID) encrypted using the slice-AAA/InfM-AAA's public key, or authorization signature for the UE 1801, or the UE's service preference.

In various embodiments, the authorization response may include the UE's service subscription if the server-AAA/service provider 1804 knows UE service preference. The UE's service subscription may be encrypted using a session key. The authorization response may include the UE's service preference if the slice-AAA/InfM-AAA 1803 does not know the UE's service preference. The UE's service preference may be encrypted using the slice-AAA/InfM-AAA's public key. If the UE 1801 accesses to old server (A), the authorization response will not include the authorization signature for the UE 1801 and the UE's service subscription. The UE's temporary ID or authentication ID (e.g. UE_server_TID) may be encrypted using the slice-AAA/InfM-AAA's public key.

The slice-AAA/InfM-AAA 1803, at step 1826, verifies the signed auth response, and establishes mapping for the temporary IDs or authentication IDs for the UE 1801 (e.g. mapping UE_server_TID with UE_slice/InfM_TID).

In some embodiments, the slice-AAA/InfM-AAA 1803, at step 1828, may send an ID delivery message to the server-AAA/service provider 1804. The ID delivery message may include one or more parameters such as the new random ID to identify the UE 1801 (e.g. TK_ss), the UE's temporary ID or authentication ID (e.g. UE_slice\InfM_TID) and the UE's service preference. The UE's service preference may be included in the message if the server-AAA/service provider 1804 does not have a record thereof. The UE's temporary ID or authentication ID (e.g. UE_slice\InfM_TID) and UE's service preference may be encrypted using the server-AAA/service provider's public key. In response to the ID delivery message, the server-AAA or service provider 1804, at step 1830, may transmit the UE's service subscription to the slice-AAA/InfM-AAA 1803. The UE's service subscription may be encrypted using a session key.

The slice-AAA/InfM-AAA 1803 sends an auth response to the Inf-AAA/infrastructure provider 1802. The authorization response may be signed using the slice-AAA/InfM-AAA's private key, and include one or more parameters such as the server-AAA/service provider's ID, the slice-AAA/InfM-AAA's ID, the new random ID (e.g. new TK_is), the UE's temporary ID or authentication ID (e.g. UE_slice_TID or UE_InfM_TID), the slice-AAA/InfM-AAA's authorization signature for the UE 1801, the UE's service subscription from the server-AAA/service provider 1804, the UE's service subscription from the slice-AAA/InfM-AAA 1803, and the UE's service preference.

In various embodiments, the UE's service subscription from the server-AAA/service provider 1804 and the UE's service subscription from the slice-AAA/InfM-AAA 1803 may be encrypted. The UE's temporary ID or authentication ID (e.g. UE_slice_TID or UE_InfM_TID) may be encrypted using the Inf-AAA/infrastructure provider's public key. The UE's service preference may be encrypted using the Inf-AAA/infrastructure provider's public key if the Inf-AAA/infrastructure provider 1802 does not have a record of the UE's service preference. If the UE 1801 accesses to old slice (A)/InfM (A), the response will not include the slice-AAA/InfM-AAA's authorization signature for the UE 1801 and the UE's service subscription from the slice-AAA/InfM-AAA 1803.

Upon receiving the auth response, the Inf-AAA/infrastructure provider 1802, at step 1834, verifies the received authorization response and establishes mapping for the temporary IDs or authentication IDs for the UE 1801 (e.g. mapping UE_slice/InfM_TID with UE_Inf_TID).

At step 1836, the Inf AAA/infrastructure provider 1802 may send a ID delivery message to the slice-AAA/InfM-AAA 1803. The ID delivery message may include one or more parameters such as the new random ID to identify the UE 1801 (e.g. new TK_is), the UE's temporary ID or authentication ID (e.g. UE_Inf_TID) and the UE's service preference. In various embodiments, the UE's temporary ID or authentication ID (e.g. UE_Inf_TID) may be encrypted using the slice-AAA/InfM-AAA's public key. The UE's service preference may be encrypted using the slice-AAA/InfM-AAA's public key if the slice-AAA/InfM-AAA 1803 does not have a record thereof.

At step 1838, the slice-AAA/InfM-AAA 1803 may transmit the UE's service subscription to the Inf_AAA/infrastructure provider 1802. The UE's service subscription may be encrypted using a session key.

In the case of request entity (A,x,x), the slice-AAA/InfM-AAA 1803 obtains the UE's service preference only after step 1836. In such cases, the slice-AAA/InfM-AAA 1803 may send an ID delivery message to the server-AAA/service provider 1804 at step 1840. The ID delivery message may include one or more parameters such as the new random ID to identify the UE 1801 (e.g. new TK_ss), the UE's service preference. The UE's service preference may be encrypted using the server-AAA/service provider's public key if the server-AAA/service provider 1804 does not have a record thereof.

At step 1842, the server-AAA/service provider 1804 may transmit the UE's service subscription to the Inf AAA/infrastructure provider 1802. The UE's service subscription may be encrypted using a session key.

At step 1844, the Inf_AAA/infrastructure provider 1802 sends the mobility registration response to the UE 1801. The mobility registration response may be signed using the Inf-AAA/infrastructure provider's private key. The mobile registration response may include one or more of temporary UE IDs or authentication IDs (e.g. UE_slice_TID, UE_InfM_TID, UE_Inf_TID) and authorization signatures for the UE 1801. The mobility registration response may include one or more parameters such as the random ID for access to the Inf_AAA/infrastructure provider 1802 (or new infrastructure), the Inf_AAA/infrastructure provider's ID, the slice-AAA/InfM-AAA's ID, the server-AAA/service provider's ID, the UE's services subscription from the Inf_AAA/infrastructure provider 1802, the slice-AAA/InfM-AAA 1803 or the server-AAA/service provider 1804, the slice-AAA/InfM-AAA's authorization signature for the UE 1801 and the server-AAA/service provider's authorization signature for the UE 1801. If the UE 1801 accesses to old infrastructure (A), the mobility registration response will not include the UE's service subscription from the infrastructure provider. In various embodiments, the UE's service subscription from the Inf_AAA/infrastructure provider 1802, the slice-AAA/InfM-AAA 1803 or the server-AAA/service provider 1804 may be encrypted.

The UE 1801, at step 1846, verifies and decrypts the signed mobility registration response using the Inf-AAA/infrastructure provider's public key. Then, the UE 1801 keeps or stores one or more temporary UE IDs or authentication IDs (e.g. UE_slice_TID, UE_InfM_TID, UE_Inf_TID) and authorization signatures for the UE 1801.

After collecting some mapping information for the new temporary UE IDs or authentication IDs, for example mapping table(s), the slice-AAA/InfM-AAA 1803, at step 1848, sends the mapping information to the AAA management via offline, online or combination of both.

Figure 19:
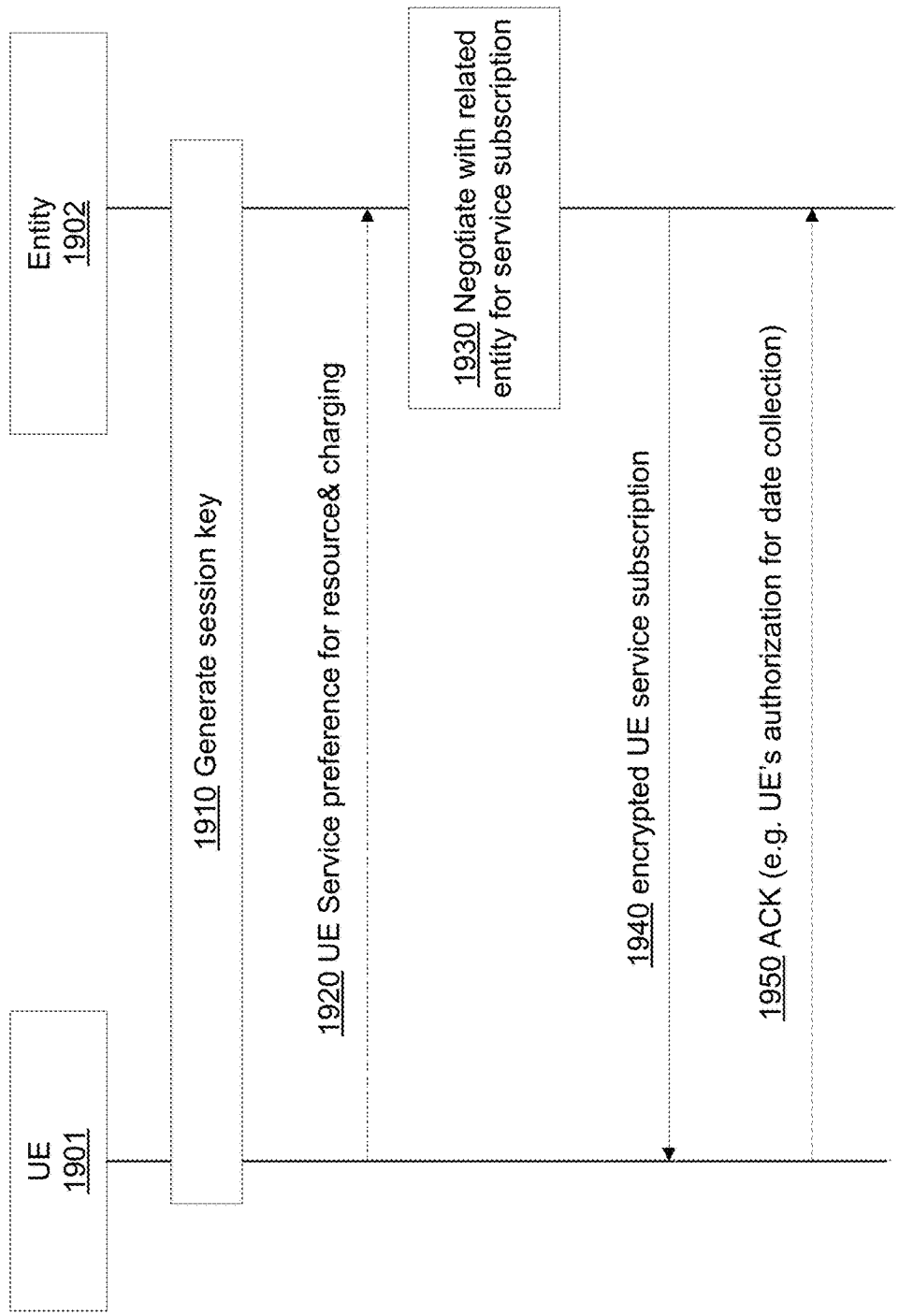
FIG. 19 illustrates a method for UE service subscription provision, in accordance with embodiments.

Embodiments of the present disclosure can provide UE subscription. FIG. 19 illustrates a method for UE service subscription provision, in accordance with embodiments of the present disclosure. According to embodiments, as is illustrated elsewhere in this application, for instance in FIGS. 12, 17 and 18, a UE's service subscription may be encrypted using a (temporary) session key. The temporary session key may be assigned to the UE by the AAA management function if the UE is authenticated by then AAA management function. This temporary session key may be used only one time.

Referring to FIG. 19, at step 1910, the session key may be established during access authentication procedure. After the access authentication is established, the UE 1901, at step 1920, may send the UE's service preference message to an entity (e.g. slice controller, slice provider, infrastructure provider, or service provider). The UE's service preference message may include the resource(s) to which the UE 1901 prefers, charging methods, or both.

At step 1930, the entity 1902 may negotiate with relevant entities for the UE's service subscription. Upon completion of the negotiation, the entity 1902, at step 1940, may send the UE service subscription to the UE 1901, if the UE 1901 is authenticated. The UE service subscription may include a list of available or allowed entities and their corresponding keys, security requirements (e.g. required granularity (or level) of security), request for the UE's authentication to collect the UE data to enhance UE experience, (new) temporary UE IDs or authentication UE IDs, or any combination thereof. The UE service subscription may be encrypted using a (temporary) session key.

In some embodiments, the UE service subscription may be included in the registration response to the UE. In this case, the UE service subscription may be negotiated after an access authentication procedure, and the step of requesting the UE's service preference message (e.g. step 1920) may not be performed.

Upon receipt of the UE service subscription, the UE 1901, at step 1950, may send an acknowledgement message to the entity 1902. The acknowledgement message may include the UE's authorization for collecting data about the 1901.

According to embodiments, the UE service subscription may be received from various entities (e.g. slice controller, slice/InfM provider, infrastructure provider, or service provider). However, a charging server, which may be controlled by a slice controller, slice provider or infrastructure manager, may keep these UE service subscriptions for generating charge or bill.

Figure 20:
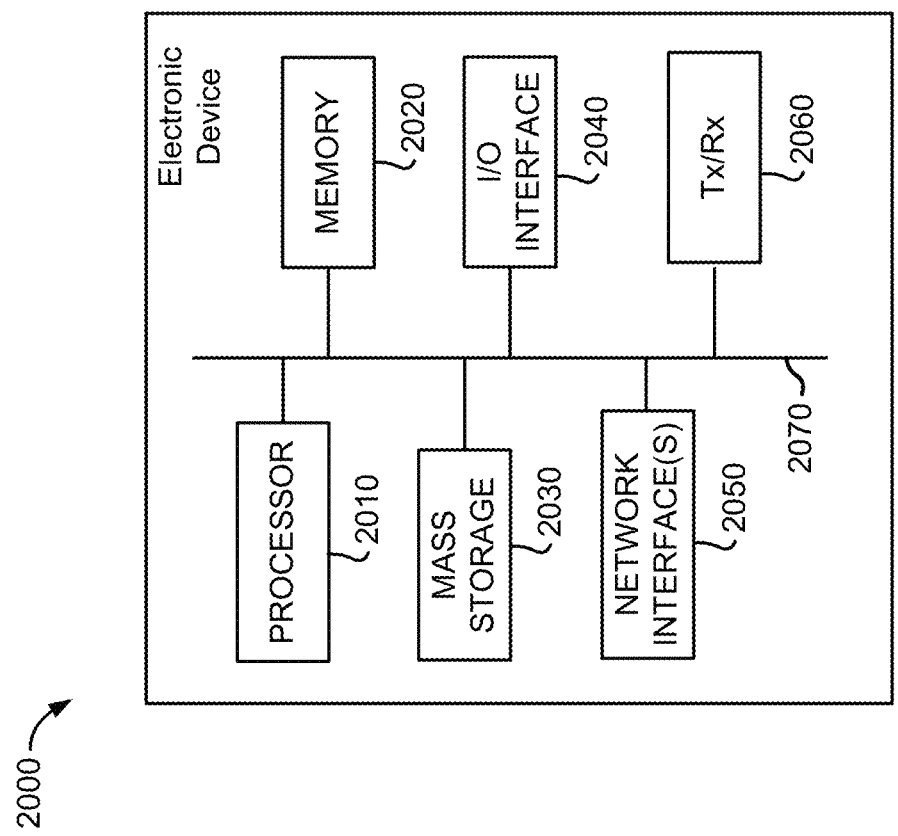
FIG. 20 illustrates, in a schematic diagram, an electronic device in accordance with embodiments.

FIG. 20 is a schematic diagram of an electronic device 2000 that may perform any or all of operations of the above methods and features explicitly or implicitly described herein, according to different embodiments of the present disclosure. For example, a computer equipped with network function may be configured as electronic device 2000. The electronic device may be a mobile device or a device forming part of a cell or base station, a radio access node, control function, infrastructure, or other device in a wireless communication access network or core network. The electronic device may be a device forming part of an application provider, an infrastructure provider, an infrastructure manager, a slice provider, a service provider, or an AAA (authentication, authorization and accounting) server deployed by one of said devices (e.g. slice-AAA, server-AAA, Inf-AAA, InfM-AAA, etc.). The electronic device may be a device forming part of the distributed trust third party or an AAA server or an AAA management function in the distributed trust third party.

As shown, the device includes a processor 2010, such as a Central Processing Unit (CPU) or specialized processors such as a Graphics Processing Unit (GPU) or other such processor unit, memory 2020, non-transitory mass storage 2030, I/O interface 2040, network interface 2050, and a transceiver 2060, all of which are communicatively coupled via bi-directional bus 2070. According to certain embodiments, any or all of the depicted elements may be utilized, or only a subset of the elements. Further, the device 2000 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 2020 may include any type of non-transitory memory such as static random access memory (SRAM), dynamic random access memory (DRAM), synchronous DRAM (SDRAM), read-only memory (ROM), any combination of such, or the like. The mass storage element 2030 may include any type of non-transitory storage device, such as a solid state drive, hard disk drive, a magnetic disk drive, an optical disk drive, USB drive, or any computer program product configured to store data and machine executable program code. According to certain embodiments, the memory 2020 or mass storage 2030 may have recorded thereon statements and instructions executable by the processor 2010 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A system for unified authentication of a user equipment (UE) in a communication network, the system comprising:
a third party communicatively trusted by and connected to the UE and one or more network entities, the third party configured to:
obtain identity information indicative of identity of the UE or the network entities;
verify the UE and the network entities on whether the UE and the network entities are authorized to perform communications in the communication network;
create mapping information, the mapping information including mappings between each identity indicated by the identity information and a respective temporary identifier (ID);
according to the mapping information, transmit the respective temporary ID to each of the UE and the network entities that are verified successfully by the third party;
receive a request from the UE or the network entities, the request including one or more of: an identification proof of the UE or the network entities, the identity information indicative of identity of the UE or the network entities, a preference indicative of a network to which the UE or the network entities prefer to access and a preference indicative of a service to which the UE or the network entities prefer to access, or a combination thereof indicated by an identification cipher;
verify whether the received information matches information maintained by the third party;
upon a successful verification, transmit information indicating one or more subscriptions to the UE or the network entities; and
sign the one or more subscriptions based on authentication information indicative of authorization to the UE; and
the one or more network entities to which the UE is authenticated to access, each of the network entities is configured to:
generate a temporary ID for the UE;
transmit the temporary ID to the third party
communicate with the UE or other network entities based on their respective temporary ID; and
verify the indicated subscriptions based on a public key of the third party.

2. The system of claim 1, wherein the third party is further configured to perform
obtaining the temporary ID from the network entities.

3. The system of claim 1, wherein each of the network entities is configured as one or more of:
a service provider configured to provide services to the UEs,
a network slice provider configured to provide network slice resources for the services,
an infrastructure provider configured to provide an infrastructure to support the services,
an infrastructure manager configured to manage the infrastructure or a cell under a management of an access node.

4. The system of claim 1, wherein the request is a response to an initial registration request, the request includes information indicating one or more subscriptions include one or more of:
the mapping information;
a temporary session key associated with the UE;
the temporary IDs;

a list of available infrastructure providers and serving public keys from the available infrastructure providers;

a list of available slices provided by a network slice provider and serving public keys from the network slice provider;

a list of available services provided by a service provider and serving public keys from the service provider; and a list of available infrastructure managers and serving public keys from the available infrastructure managers.

5. The system of claim 1, wherein a temporary ID associated with other network entities is unknown to a particular network entity.

6. The system of claim 1, wherein only the UE and the third party maintain the mapping information.

7. A system for unified authentication of a user equipment (UE) in a communication network, the system comprising:

a third party communicatively trusted by and connected to the UE and one or more network entities, the third party configured to:

obtain identity information indicative of identity of the UE or the network entities;

verify the UE and the network entities on whether the UE and the network entities are authorized to perform communications in the communication network;

create mapping information, the mapping information including mappings between each identity indicated by the identity information and a respective temporary identifier (ID); and according to the mapping information, transmit the respective temporary ID to each of the UE and the network entities that are verified successfully by the third party; and the one or more network entities to which the UE is authenticated to access; and each of the network entities is configured to:

generate a temporary ID for the UE;

transmit the temporary ID to the third party; and communicate with the UE or other network entities based on their respective temporary ID; and manage mobility of the UE by:

receiving a request for updating the temporary ID, the request including the temporary ID and an ID of a network entity that sends the request;

verifying the temporary ID;

upon a successful verification, generating one or more new temporary ID and updating local mapping information to include mappings associated with the new temporary IDs; and notifying the third party and other network entities of the new temporary ID.

8. The system of claim 7, wherein the request is an authorization request further including one or more of: an encrypted request transaction, a random ID, and one or more signatures of the network entities associated with the request, each of the signatures indicative of authorization to the UE.

9. The system of claim 8, wherein each of the other network entities is further configured to:

in response to the request for updating the temporary ID, transmit a response including a service subscription for the UE; and generate the signature indicative of authorization to the UE according to received new temporary ID.

10. The system of claim 7, wherein the third party is further configured to perform at least one of:

obtaining the temporary ID from the network entities; and generating an ID according to the identity information indicative of identity of the UE.

11. The system of claim 7, wherein each of the network entities is configured as one or more of:

a service provider configured to provide services to the UEs, a network slice provider configured to provide network slice resources for the services, an infrastructure provider configured to provide an infrastructure to support the services, an infrastructure manager configured to manage the infrastructure or a cell under a management of an access node.

12. A method for unified authentication of a user equipment (UE) in a communication network, the method comprising:

obtaining, by a third party communicatively trusted by and connected to the UE and one or more network entities; identity information indicative of identity of the UE or the network entities;

verifying, by the third party, the UE and the network entities on whether the UE and the network entities are authorized to perform communications in the communication network;

creating, by the third party, mapping information, the mapping information including mappings between each identity indicated by the identity information and a respective temporary identifier (ID), and according to the mapping information, transmitting, by the third party, the respective temporary ID to each of the UE and the network entities that are verified successfully by the third party; and communicating, by the one or more network entities to which the UE is authenticated to access, with the UE or other network entities based on their respective temporary ID;

wherein managing mobility of the UE comprises:

receiving, by each of the network entities, a request for updating the temporary ID, the request including the temporary ID and an ID of an entity that sends the request;

verifying, by each of the network entities, the temporary ID;

upon a successful verification, generating, by each of the network entities, one or more new temporary ID and updating local mapping information to include mappings associated with the new temporary IDs; and notifying, by each of the network entities, the third party and other network entities of the new temporary ID.

13. The method of claim 12, wherein the third party performs obtaining the temporary ID from the network entities.

14. The method of claim 12, further comprising:

receiving, by the third party, a request from the UE or the network entities, the request including one or more of: an identification proof of the UE or the network entities, the identity information indicative of identity of the UE or the network entities, a preference indicative of a network to which the UE or the network entities prefer to access and a preference indicative of a service to which the UE or the network entities prefer to access, or a combination thereof indicated by an identification cipher;

verifying, by the third party, whether the received information matches information maintained by the third party; and upon a successful verification, transmitting, by the third party, information indicating one or more subscriptions to the UE or the network entities.

15. The method of claim 12, wherein each of the network entities is configured as one or more of:
   a service provider configured to provide services to the UEs,
   a network slice provider configured to provide network slice resources for the services,
   an infrastructure provider configured to provide an infrastructure to support the services,
   an infrastructure manager configured to manage the infrastructure or a cell under a management of an access node.

16. The method of claim 12, wherein the request is a response to an initial registration request, the request including information indicating one or more subscriptions include one or more of:
   the mapping information;
   a temporary session key associated with the UE;
   the temporary IDs;
   a list of available infrastructure providers and serving public keys from the available infrastructure providers;
   a list of available slices provided by a network slice provider and serving public keys from the network slice provider;
   a list of available services provided by a service provider and serving public keys from the service provider; and
   a list of available infrastructure managers and serving public keys from the available infrastructure managers.

17. The method of claim 12, further comprising:
   signing, by the third party, the one or more subscriptions based on authentication information indicative of authorization to the UE; and
   verifying, by each of the network entities, the indicated subscriptions based on a public key of the third party.

* * * * *